US011119340B2

(12) United States Patent
Ahi

(10) Patent No.: US 11,119,340 B2
(45) Date of Patent: Sep. 14, 2021

(54) ANTI-FOG MEDICAL FACE MASK AND A DEVICE FOR PREVENTING FORMATION OF FOG ON EYEWEAR WHILE WEARING FACE COVER

(71) Applicant: Kiarash Ahi, San Jose, CA (US)

(72) Inventor: Kiarash Ahi, San Jose, CA (US)

( * ) Notice: Subject to any disclaimer, the term of this patent is extended or adjusted under 35 U.S.C. 154(b) by 0 days.

(21) Appl. No.: 17/030,410

(22) Filed: Sep. 24, 2020

(65) Prior Publication Data

US 2021/0041724 A1    Feb. 11, 2021

Related U.S. Application Data

(60) Provisional application No. 63/076,401, filed on Sep. 10, 2020.

(51) Int. Cl.
*G02C 11/08* (2006.01)
*A41D 13/11* (2006.01)

(52) U.S. Cl.
CPC .............. *G02C 11/08* (2013.01); *A41D 13/11* (2013.01)

(58) Field of Classification Search
CPC .......... A61F 9/045; A61F 9/028; A61F 9/029; A61F 9/025; A41D 13/1184; G02C 11/08; G02C 5/001; A62B 18/082
(Continued)

(56) References Cited

U.S. PATENT DOCUMENTS

| 4,944,039 A | * | 7/1990 | Dietrich | ................... | A61F 9/029 2/13 |
| 5,704,063 A | * | 1/1998 | Tilden | ................ | A41D 13/1107 2/9 |
| 2008/0143953 A1 | * | 6/2008 | Welchel | ............. | A41D 13/1184 351/62 |

FOREIGN PATENT DOCUMENTS

WO    WO-2017103964 A1 *  6/2017    ............. G02C 11/08

OTHER PUBLICATIONS

Hakoishi Hidemasa, Eyeglass Antifogging Apparatus, 2017 (Year: 2017).*

* cited by examiner

*Primary Examiner* — Alireza Nia
*Assistant Examiner* — Robin Han

(57) ABSTRACT

Toward prevention of the spread of COVID-19 virus and suppressing the pandemic caused by this outbreak, many local governments, states within the Unites States, and countries around the globe have mandated wearing of face covering masks. This mandate has introduced new challenges to the society. One of these challenges is formation of fog on the eyewear while wearing a mask. The direction of the leaked exhaled air from the upper edge of a face covering mask is upward. The location of the portion of the lens of the eyewear that is in front of the eye of the user is on top of the upper edge of the mask (because pulling up the mask further than the eye is not practically possible as the mask would block the eyesight). Hence, the leaked exhaled air (leaked from the top of the mask) moves over the surface of the lens of the eyewear and causes formation of fog on the surface of the lens of the eyewear. To solve the problem of formation of fog on the lens of an eyewear while wearing a face cover, this disclosure proposes a device that prevents the eyewear from getting exposed to the air of exhaling. For this aim, this device redirects the flow of the exhaled air that leaks from the top of the mask. Unlike the solutions in the prior art, the main embodiment of the device disclosed in this application is a standalone device. No modification to the eyewear is needed (although one embodiment of this invention is integrated in the eyewear during manufacturing the eyewear). No modification to the face covering mask is needed either (although one embodiment of this invention is integrated in the face covering mask during manufacturing the
(Continued)

Figure 1:
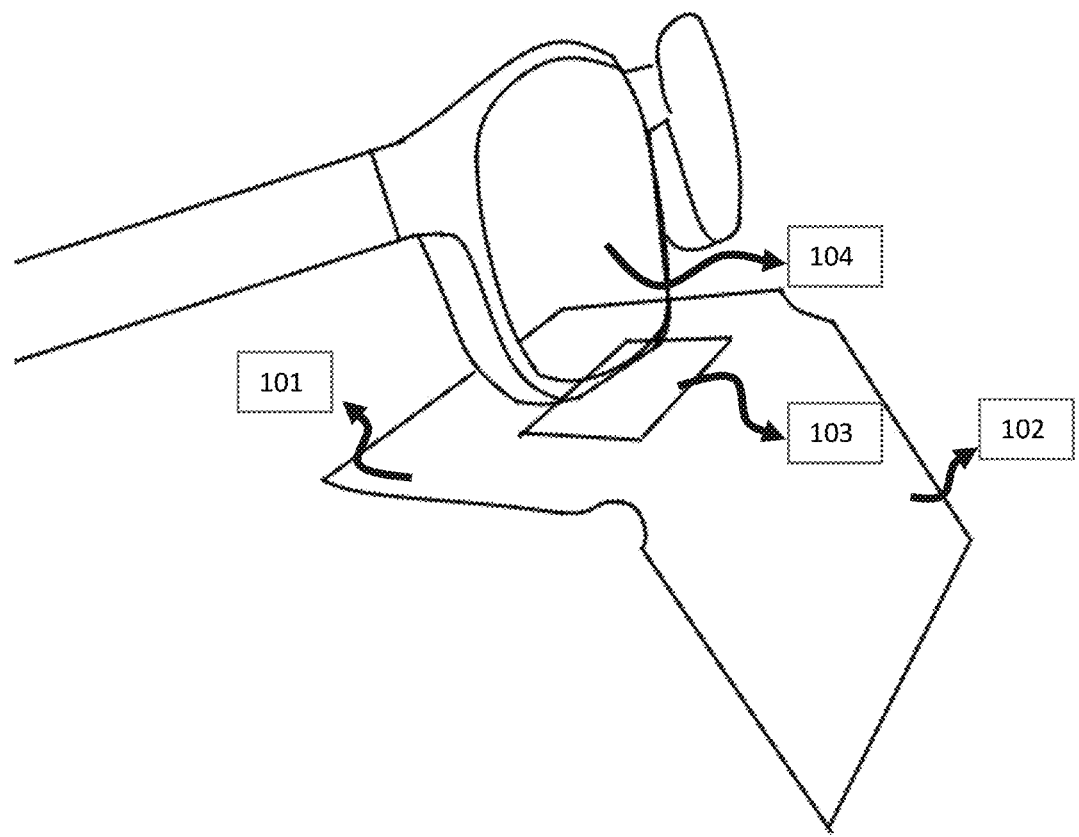
Figure 1:
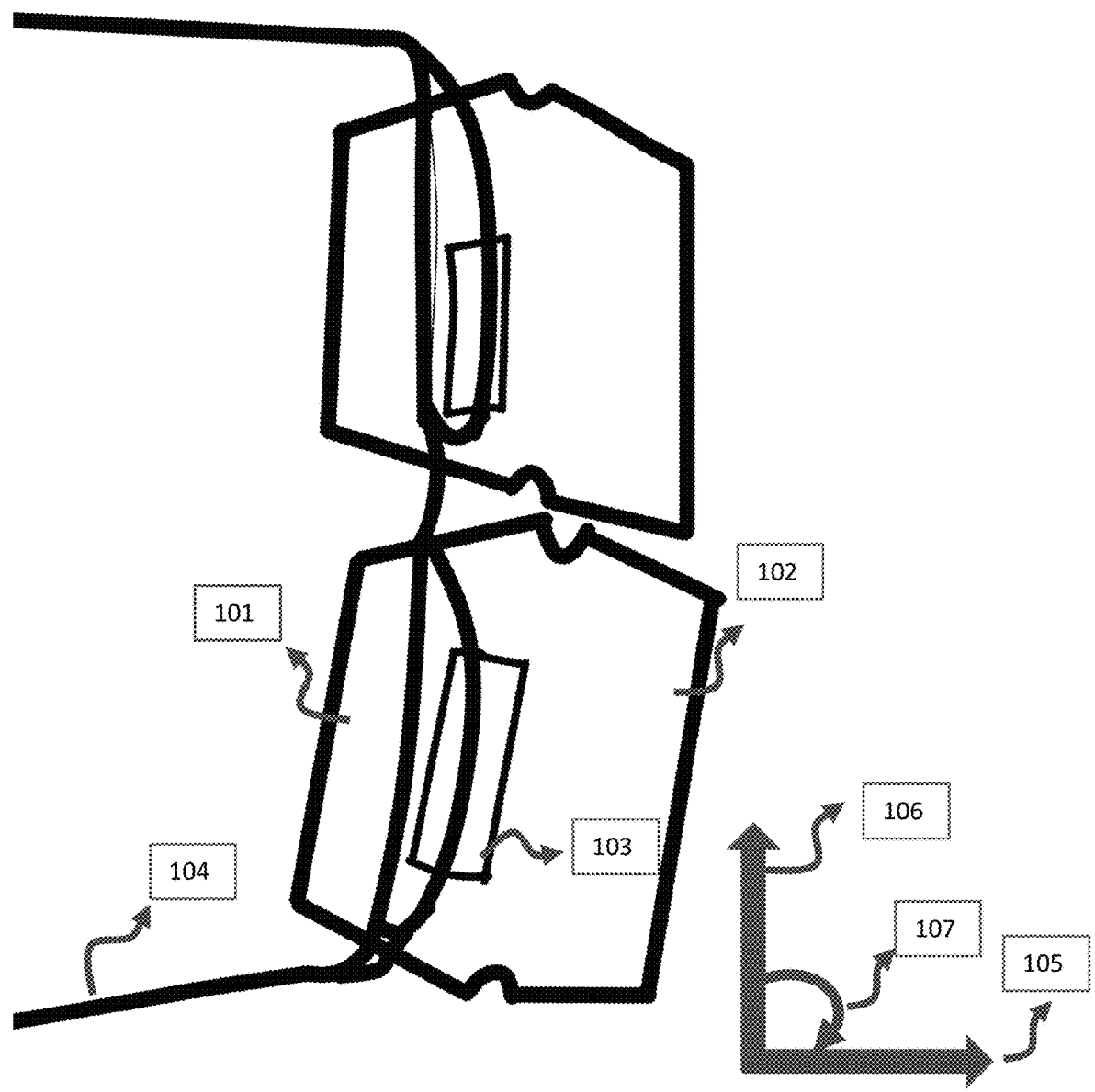
Figure 1:
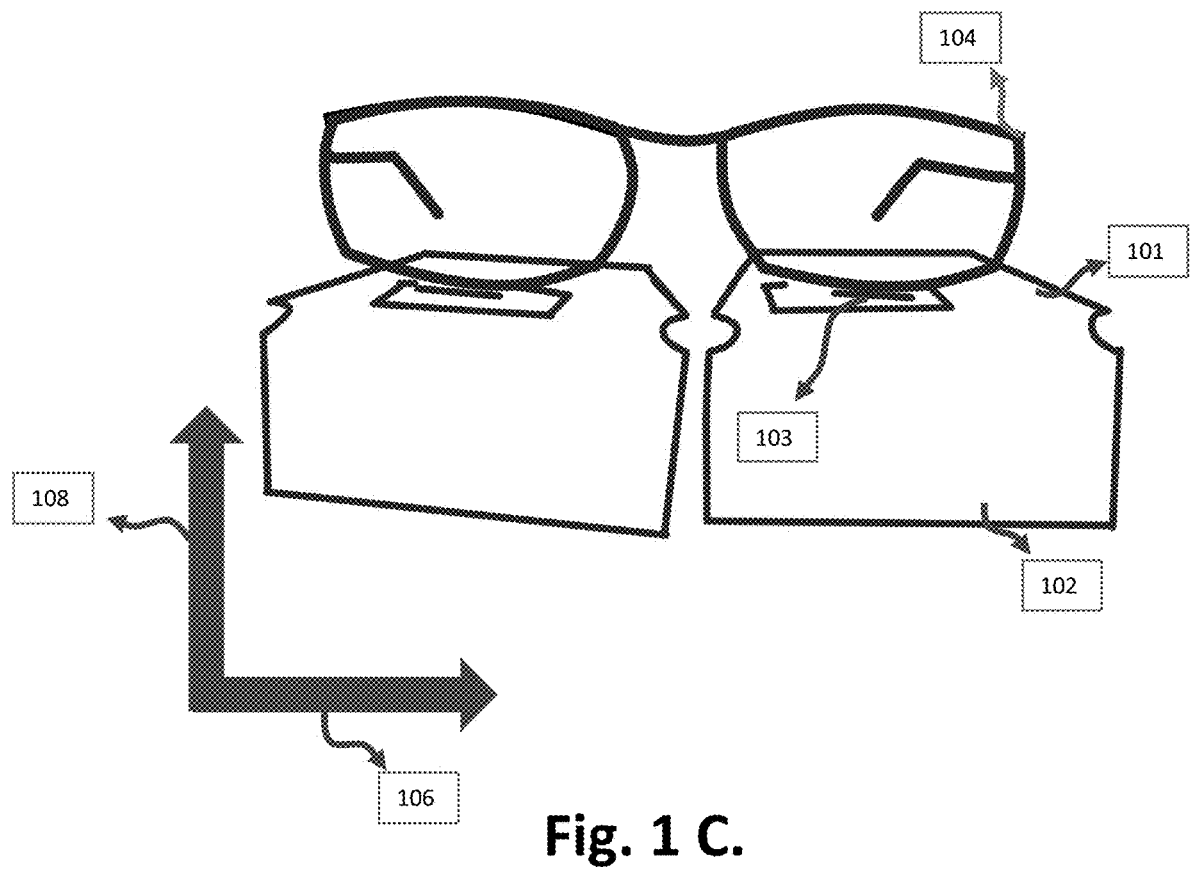

face covering mask). Hence, people in the society who need to wear mask, may use this device without needing to purchase new types of eyewear or new types of mask. This device prevents formation of fog on eyewear regardless of the type of eyewear or the type of the mask worn by a user. Hence, compared with the prior art, this device introduces the least amount of discomfort and financial burden on the users and on the society. A significant advantage of the disclosed invention is its contribution to the health of the society and reduction of the spread of viruses. Thanks to this invention a large portion of the society (who refuses wearing masks at all, or who wear masks improperly to avoid formation of fog on their eyewear) shall start using masks and shall wear masks properly. For example, people who may refuse wearing masks during pandemics, such as the COVID-19 pandemic, because of discomfort resulted by formation of fog on their eyewear, or people who may wear masks improperly (for example by not covering their noses) or those who may create vents in their masks, to prevent formation of fog on their eyewear, will start wearing their masks properly since the device disclosed in this disclosure prevents formation of fog on the eyewear.

22 Claims, 18 Drawing Sheets

(58) Field of Classification Search
USPC .......... 128/858, 857, 206.22, 206.19; 2/436, 2/435, 13; 351/41
See application file for complete search history.

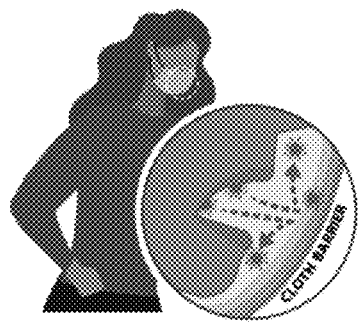

Evidence for Effectiveness of Masks

Masks are recommended as a simple barrier to help prevent respiratory droplets from traveling into the air and onto other people when the person wearing the mask coughs, sneezes, talks, or raises their voice. This is called source control. This recommendation is based on what we know about the role respiratory droplets play in the spread of the virus that causes COVID-19, paired with emerging evidence from clinical and laboratory studies that shows masks reduce the spray of droplets when worn over the nose and mouth. COVID-19 spreads mainly among people who are in close contact with one another (within about 6 feet), so the use of masks is particularly important in settings where people are close to each other or where social distancing is difficult to maintain. CDC's recommendations for masks will be updated as new scientific evidence becomes available.

Fig. 8 A.

Masks with Exhalation Valves or Vents

The purpose of masks is to keep respiratory droplets from reaching others to aid with source control. However, masks with one-way valves or vents allow air to be exhaled through a hole in the material, which can result in expelled respiratory droplets that can reach others. This type of mask does not prevent the person wearing the mask from transmitting COVID-19 to others. Therefore, CDC does not recommend using masks for source control if they have an exhalation valve or vent.

Fig. 8 B.

ANTI-FOG MEDICAL FACE MASK AND A DEVICE FOR PREVENTING FORMATION OF FOG ON EYEWEAR WHILE WEARING FACE COVER

CROSS REFERENCES TO RELATED APPLICATIONS

This application claims the benefit of provisional application Ser. No. 63/076,401, filed Sep. 10, 2020 by the present inventor.

BACKGROUND

Field of Invention

The present invention relates to a device for preventing formation of fog on eyewear while wearing a face covering mask.

Field of Search: 206.12, 206.13, 206.21, 205.25

Prior Art

The following is a tabulation of some prior art that presently appear relevant:

| U.S. Patents | | |
|---|---|---|
| Pat. No. | Issue Date | Patentee |
| 10,357,672 B2 | Jul. 23, 2019 | Bora |
| 4,209,234 | Jun. 24, 1980 | McCooeye |
| 4,944,294 | Jul. 31, 1990 | Borek, Jr. |
| 7,703,456 B2 | Apr. 27, 2010 | Yahiaoui et al. |
| U.S. Pat. No. 6,988,500 B1 | Jan. 24, 2006 | Cox |
| U.S. Pat. No. 6,354,296 B1 | Mar. 12, 2002 | Baumann et al. |
| 3,974,829 | Aug. 17, 1976 | Tate, Jr. |
| 3,888,246 | Jun. 10, 1975 | Lauer |
| 3,890,966 | Jun. 24, 1975 | Aspelin |
| 4,419,993 | Dec. 13, 1983 | Petersen |

BACKGROUND ART

Technical Problem

Toward prevention of the spread of COVID-19 virus and for suppressing the pandemic caused by this outbreak, many local governments, states within the Unites States, and countries around the globe have mandated wearing of face covering masks. This mandate has introduced new challenges to the society. One of these challenges is the fact that wearing mask causes the eyewear to be exposed to the air of exhaling. The air of exhaling, while wearing a mask, causes formation of fog on the eyewear.

Besides the masks that are used for prevention of the spread of the virus, other types of face covers such as face covers that are worn during the winters for protecting the face from the cold air cause formation of fog on the eyewear.

The reason for formation of the fog on the eyewear when wearing a mask is explained in this paragraph. The direction of the leaked exhaled air from the top of the mask is upward. The location of the eye on the face of the user is above the mask. Thus, the part of the lens of the eyewear that is in front of the eye of the user is located above the upper edge of the mask. Hence, the leaked exhaled air moves on the surface of the eyewear and causes formation of fog on the surface of the eyewear. Some people pull up the mask toward their eyes in the hope that it would be resulted in preventing formation of fog on the eyewear. However, it is impossible to pull up the mask higher than the eye because the mask will block the eye of the user.

To solve the problem of formation of fog on the eyewear while wearing a mask, this disclosure proposes a device that prevents the eyewear from being exposed to the air of exhaling. For this aim, this device redirects the flow of the exhaled air that leaks from the top of the mask to a direction that is not toward the eyewear worn by the user. Unlike the solutions in the prior art, the main embodiment of the device disclosed in this application is a standalone device. No modification to the eyewear is needed (although one embodiment of this invention is integrated in the eyewear during manufacturing the eyewear). No modification to the face covering mask is needed either (although one embodiment of this invention is integrated in the face covering mask during manufacturing the face covering mask). Hence, people in the society who need to wear masks, may use this device without needing to purchase new types of eyewear or new types of mask. This device prevents formation of fog on eyewear regardless of the type of the eyewear or the type of the mask worn by a user. Hence, compared with the prior art, this device introduces the least amount of discomfort and financial burden on the users and on the society. A significant advantage of the present invention is its contribution to the health of the society and reduction of the spread of viruses. Thanks to this invention a large portion of the society (who refuses wearing masks at all, or who wear masks improperly to avoid formation of fog on their eyewear) shall start using masks and shall wear masks properly. For example people who may refuse wearing masks during pandemics, such as the COVID-19 pandemic, because of discomfort resulted by formation of fog on their eyewear, or people who may wear masks improperly (for example by not covering their noses) or those who may create vents in their masks, to prevent formation of fog on their eyewear, will start wearing their masks properly since the device disclosed in this disclosure prevents formation of fog on the eyewear.

The reason that no fog is formed from the exhaled air while no mask is worn is the fact that the nose of the user naturally redirects the exhaled air downwardly. The disclosed device in this application also redirects the exhaled air, which leaks from the top of the mask, to a direction that is downward and is toward directions where the eyewear is not located.

Next paragraphs describe solutions to the problem, of formation of fog on an eyewear while wearing a mask, in the prior art.

For preventing the formation of the fog on the eyewear while wearing a mask, one solution practiced naturally by the mask wearers, is to place the nose outside of the mask. In this way, the direction of the exhaled air will be downward and thus, the eyewear will not be exposed to the exhaled air. Nonetheless, the health guidelines require a face covering mask to cover the nose. FIG. 8A. illustrates the mentioned health guidelines in a screenshot taken from CDC website on Sep. 12, 2020 (https://www.cdc.gov/coronavirus/2019-ncov/prevent-getting-sick/cloth-face-cover-guidance.html).

Another method, which is popular among the members of the healthcare society such as dentists and medical doctors, for preventing formation of the fog on the eyewear while wearing a mask is to tape, using an adhesive tape, the top of the mask to the skin of the face of the user in order to prevent leaking of the exhaled air from the top of the mask. Noteless, taping the mask on the skin of the face causes discomfort, and may also cause allergies and other issues related to the health of the skin of the face of the user. In Addition, such method causes the flow of the air from the top of the mask to be blocked. This blockage put more pressure on the other parts of the mask when inhaling and exhaling the flow of air. This may also cause overheating the air inside the mask. This method may also cause less fresh air and oxygen to enter the mask for the user to inhale. The user may also need to put more force for inhaling and exhaling the air as there would be less opening around the mask to facilitate the flow of the air which may result in inconvenience for the user. As proposed in U.S. Pat. No. 3,974,829, as well as being practiced by the general public, a layer of pliable material may be placed between the mask and the skin of the face of the user for sealing the openings between the face of the user and the upper edge of the mask. In U.S. Pat. No. 6,354,296 B1 a mask is disclosed that includes a mask portion, a resilient member (e.g., a pillowed web), and, optionally, an adhesive portion. The resilient member and the adhesive portion are alternately positionable between the mask portion and the wearer to inhibit the passage of vapor between the mask and the wearer, which prevents fogging of the wearer's eyewear. Nonetheless, the face of human being is not flat and is not spherical. There are dents as well as sticking-out parts (such as nose) on the face. Hence, without taping with an adhesive material, complete sealing of the upper edge of the mask is not possible solely by use of pliable material. It is due to the fact that the forces that keep the mask on the face of the user are applied through the straps, such as rubber bands, that go around the head or the ears of the user and are attached to the sides of the mask. In other words, forces applied by said straps to the sides of the mask are not being applied directly on the front of the mask toward the face of the user. Hence, these forces cannot push the pliable material and the upper edge of the mask over the dents of the face of the user directly. In other words, since the nose sticks out of the face of the user and gives the face a shape that is not flat and is not spherical, the forces that keep the mask on the face are not being applied on the sides of the nose and also have weaker effects on the parts of the face that are not sticking out such as areas under the eyes (since these part of the face are not sticking out of the face as the nose is). One solution (for providing the force that can attach the mask uniformly on the skin of the face on places such as sides of the nose and the skin of the face that is under the eyes) is taping the mask on the skin of the face by using adhesive tapes. However, taping the mask on the skin of the face is inconvenient. Taping the mask on the skin of the face can also causes allergies and other issues related to the health of the skin of the face of the user. In Addition, such method causes the flow of the air from the top of the mask to be blocked. This blockage put more pressure on the other parts of the mask when inhaling and exhaling the flow of air. This may also cause overheating the air inside the mask. This method may also cause less fresh air and oxygen to enter the mask for the user to inhale. The user may also need to put more force for inhaling and exhaling the air as there would be less opening around the mask to facilitate the flow of the air which may result in inconvenience for the user.

In U.S. Pat. No. 10,357,672 B2 a mask that has vents on the sides is proposed to reduce the pressure of the air inside the mask which leads to reduction of the leakage of the exhaled air from the top of the mask. Nonetheless, as explicitly mentioned on the guidelines published by CDC, vents on the mask are not recommended. FIG. 8B illustrates the guidelines published by CDC regarding the fact that vents on masks are not recommended. FIG. 8B is a screenshot captured from the web site of CDC on Sep. 12, 2020 (https://www.cdc.gov/coronavirus/2019-ncov/prevent-getting-sick/cloth-face-cover-guidance.html).

In U.S. Pat. No. 4,209,234 an electrical circuit for heating up the lenses of eyewear is proposed. Such device needs an electrical power source which may be provided by batteries. Use of batteries impose weight on the eyewear and causes inconvenience for the user. In addition, batteries have limited energy storage and are needed to be renewed often. Generating heat close to the eyes and face of the user may also cause inconvenience. Applying heat to the lenses may cause damage in the lenses as well.

In U.S. Pat. No. 4,944,294 use of an anti-glare, anti-fog material is proposed for an eye shield to prevent formation of fog due to wearing a mask. Use of an anti-glare, anti-fog material requires modifications in the eyewear, and it requires the eyewear to be manufactured with specific materials that are anti-glare, anti-fog. Hence, U.S. Pat. No. 4,944,294 does not provide a solution to the problem of formation of fog on all types of eyewear, whereas the disclosed device in the present patent application does not require modifications in the eyewear and does not require the eyewear to be made of anti-glare, anti-fog material.

In U.S. Pat. No. 3,888,246 a surgical face mask which comprises a filtration medium and an air impervious element secured to the upper portion of the mask is proposed. The impervious element functions to prevent moist breath from rising over the upper portion of the mask and fogging eyeglasses of the wearer of the mask. Nonetheless, by a simple experiment that includes taping the upper edge of the mask to the skin, it is revealed that the leaked exhaled air from the openings between the top of the mask and the skin of the user is responsible for formation of most of the fog on the eyewear. That is why sealing the mask on the skin with adhesive tape is a common practice among healthcare workers and is also suggested in U.S. Pat. No. 6,354,296 B1. Hence, redirecting the exhaled breath that rises from the mask itself downwardly by using the impervious element in U.S. Pat. No. 3,888,246 would not effectively contribute to solving the problem of formation of fog on the eyewear while wearing a mask. Even if the mask in U.S. Pat. No. 3,888,246 may also bear impervious elements around all the edges thereof (as suggested in U.S. Pat. No. 3,888,246) formation of fog on the eyewear will not be prevented because the exhaled air leaks from the openings between the skin of the face of the user and the upper edge of the mask. Since the top of the mask covers the part of the face of the user that includes organs (such as nose) in the face of human being that are not shaped uniformly (and hence the face is not flat or is not shaped spherically), there is no way to prevent openings between the skin of the user and the top of the mask unless adhesive tapes are used for sealing the top of the mask to the skin of the face of the user, or the sealing force is applied by direct force from the front of the face of the user (as disclosed in an embodiment in the present patent application). The straps (or rubber bands) that secure the mask to the face of the user through back of the ears or back of the skull cannot apply direct force on the top edge of the mask that covers sides of the nose. Similarly, the force applied by said straps have less effect on areas that include dents such as the lower parts of the eyes as compared with areas that stick out of the face such as nose. Hence, the mask proposed in U.S. Pat. No. 3,888,246 shall not contribute effectively to solving the problem of formation of fog on the eyewear while wearing a mask.

In U.S. Pat. No. 7,703,456 B2 a coating composition that is incorporated into a facemask to reduce fogging and glare is provided. U.S. Pat. No. 7,703,456 B2 is concerned with the chemical characteristics of the coating composition rather than proposing a physical device for prevention of formation of fog on an eyewear. Applying chemicals to the mask and eyewear may be an expensive and inconvenient process. It might alter characteristics of the mask and the eyewear as well and might cause allergies and other health concerns for the user. Whereas, the disclosed device in the present patent application does not require modifications in the eyewear and does not require the eyewear or the mask to be exposed to anti-glare, anti-fog material.

In U.S. Pat. No. 3,890,966 a mask is disclosed with a sheet of air impervious material, said sheet having slits or vents which define flaps that are outwardly moveable under the influence of exhaled breath to provide paths for directing the flow of exhaled breath away from the eyes of the wearer of the mask. Such vents reduce the pressure of the exhaled air inside the mask, and hence less leakage may occur from the top edge of the mask. Nonetheless, as explicitly mentioned on the guidelines published by CDC, vents on the mask are not recommended. FIG. 8B illustrates the guidelines published by CDC regarding the fact that vents on masks are not recommended. FIG. 8B is a screenshot captured from the web site of CDC on Sep. 12, 2020 (https://www.cdc.gov/coronavirus/2019-ncov/prevent-getting-sick/cloth-face-cover-guidance.html).

In U.S. Pat. No. 4,419,993 a surgical masks is disclosed comprising: (a) a main body portion comprising a filter portion which comprises filter means divided into an upper region and a lower region, the lower region of the filter means being more permeable to air than the upper region of the filter means; (b) means for providing an effective seal between the upper edge of the main body portion and the nose of the wearer; (c) and means for securing the mask over the mouth and nose of the wearer. Nonetheless, manufacturing a mask with two different filtering materials increases the cost. In addition, by a simple experiment including taping the upper edge of the mask to the skin of the face, it is revealed that the leaked exhaled air from the openings between the top surface of the mask and the skin of the user is responsible for formation of most of the fog on the eyewear. Even if the mask in U.S. Pat. No. 4,419,993 may have an upper body that is less preamble to air than the lower body, formation of fog on the eyewear will not be prevented because the exhaled air leaks from the openings between the skin of the face of the user and the upper edge of the mask. Also, with regard to the sealing, since the top of the mask covers the part of the face of the user that includes organs (such as nose) in the face of human being that are not shaped uniformly (and hence, the face is not flat and is not shaped spherically), there is no way to prevent openings between the skin of the user and the top of the mask unless adhesive tapes are used for sealing the top of the mask to the skin of the face of the user, or the sealing force is applied by direct force from the front of the face of the user (as disclosed in an embodiment in the present patent application) not the straps (and not rubber bands) that secure the mask to the face of the user through back of the ears or back of the skull. Hence, the mask proposed in U.S. Pat. No. 4,419,993 may not effectively contribute to solving the problem of formation of fog on the eyewear while wearing a mask.

In U.S. Pat. No. 6,988,500 B1 a mask with an opening and a reduced resistance filter material placed within the opening is proposed. The reduced resistance filter material permitting air to flow relatively freely there through. This opening leads to reduction of the pressure of the air inside the mask and reduce leakage from top of the mask. Nonetheless, for prevention the spread of viruses such as COVID-19, masks are required to cover the entire nose and mouth area. In other words, as explicitly mentioned on the guidelines published by CDC, vents on the mask are not recommended. FIG. 8B illustrates the guidelines published by CDC regarding the fact that vents on masks are not recommended. FIG. 8B is a screenshot captured from the website of CDC on Sep. 12, 2020 (https://www.cdc.gov/coronavirus/2019-ncov/prevent-getting-sick/cloth-face-cover-guidance.html).

Solution to Problem

The direction of the leaked exhaled air from the upper edge of a face covering mask is upward. The location of the portion of the lens of the eyewear that is in front of the eye of the user is on top of the upper edge of the mask (because pulling up the mask further than the eye is not practically possible as the mask would block the eyesight). Hence, the leaked exhaled air (leaked from the top of the mask) moves over the surface of the lens of the eyewear and causes formation of fog on the surface of the lens of the eyewear. To solve the problem of formation of fog on the lens of an eyewear while wearing a face cover, this disclosure proposes a device that prevents the eyewear from getting exposed to the air of exhaling. For this aim, this device redirects the flow of the exhaled air that leaks from the top of the mask. Unlike the solutions in the prior art, the main embodiment of the device disclosed in this application is a standalone device. No modification to the eyewear is needed (although one embodiment of this invention is integrated in the eyewear during manufacturing the eyewear). No modification to the face covering mask is needed either (although one embodiment of this invention is integrated in the face covering mask during manufacturing the face covering mask). Hence, people in the society who need to wear mask, may use this device without needing to purchase new types of eyewear or new types of mask. This device prevents formation of fog on eyewear regardless of the type of eyewear or the type of the mask worn by a user. Hence, compared with the prior art, this device introduces the least amount of discomfort and financial burden on the users and on the society. A significant advantage of the disclosed invention is its contribution to the health of the society and reduction of the spread of viruses. Thanks to this invention a large portion of the society (who refuses wearing masks at all, or who wear masks improperly to avoid formation of fog on their eyewear) shall start using masks and shall wear masks properly. For example, people who may refuse wearing masks during pandemics, such as the COVID-19 pandemic, because of discomfort resulted by formation of fog on their eyewear, or people who may wear masks improperly (for example by not covering their noses) or those who may create vents in their masks, to prevent formation of fog on their eyewear, will start wearing their masks properly since the device disclosed in this disclosure prevents formation of fog on the eyewear.

SUMMARY

The direction of the leaked exhaled air from the upper edge of a face covering mask is upward. The location of the portion of the lens of the eyewear that is in front of the eye of the user is on top of the upper edge of the mask (because pulling up the mask further than the eye is not practically possible as the mask would block the eyesight). Hence, the leaked exhaled air (leaked from the top of the mask) moves over the surface of the lens of the eyewear and causes formation of fog on the surface of the lens of the eyewear. To solve the problem of formation of fog on the lens of an eyewear while wearing a face cover, this disclosure proposes a device that prevents the eyewear from getting exposed to the air of exhaling. For this aim, this device redirects the flow of the exhaled air that leaks from the top of the mask. Unlike the solutions in the prior art, the main embodiment of the device disclosed in this application is a standalone device. No modification to the eyewear is needed (although one embodiment of this invention is integrated in the eyewear during manufacturing the eyewear). No modification to the face covering mask is needed either (although one embodiment of this invention is integrated in the face covering mask during manufacturing the face covering mask). Hence, people in the society who need to wear mask, may use this device without needing to purchase new types of eyewear or new types of mask. This device prevents formation of fog on eyewear regardless of the type of eyewear or the type of the mask worn by a user. Hence, compared with the prior art, this device introduces the least amount of discomfort and financial burden on the users and on the society. A significant advantage of the disclosed invention is its contribution to the health of the society and reduction of the spread of viruses. Thanks to this invention a large portion of the society (who refuses wearing masks at all, or who wear masks improperly to avoid formation of fog on their eyewear) shall start using masks and shall wear masks properly. For example, people who may refuse wearing masks during pandemics, such as the COVID-19 pandemic, because of discomfort resulted by formation of fog on their eyewear, or people who may wear masks improperly (for example by not covering their noses) or those who may create vents in their masks, to prevent formation of fog on their eyewear, will start wearing their masks properly since the device disclosed in this disclosure prevents formation of fog on the eyewear.

Advantages

Accordingly, several advantages of one or more aspects are as follows: to provide a device that prevents the eyewear from being exposed to the air of exhaling, and hence preventing the formation of fog on the eyewear. For this aim, this device redirects the flow of the air from exhaled air that leaks from the top of the facemask. The direction of the leaked exhaled air from the upper edge of a face covering mask is upward. The location of the portion of the lens of the eyewear that is in front of the eye of the user is on top of the upper edge of the mask (because pulling up the mask further than the eye is not practically possible as the mask would block the eyesight). Hence, the leaked exhaled air (leaked from the top of the mask) moves over the surface of the lens of the eyewear and causes formation of fog on the surface of the lens of the eyewear. To solve the problem of formation of fog on the lens of an eyewear while wearing a face cover, this disclosure proposes a device that prevents the eyewear from getting exposed to the air of exhaling. For this aim, this device redirects the flow of the exhaled air that leaks from the top of the mask. Unlike the solutions in the prior art, the main embodiment of the device disclosed in this application is a standalone device. No modification to the eyewear is needed (although one embodiment of this invention is integrated in the eyewear during manufacturing the eyewear). No modification to the face covering mask is needed either (although one embodiment of this invention is integrated in the face covering mask during manufacturing the face covering mask). Hence, people in the society who need to wear mask, may use this device without needing to purchase new types of eyewear or new types of mask. This device prevents formation of fog on eyewear regardless of the type of eyewear or the type of the mask worn by a user. Hence, compared with the prior art, this device introduces the least amount of discomfort and financial burden on the users and on the society. A significant advantage of the disclosed invention is its contribution to the health of the society and reduction of the spread of viruses. Thanks to this invention a large portion of the society (who refuses wearing masks at all, or who wear masks improperly to avoid formation of fog on their eyewear) shall start using masks and shall wear masks properly. For example, people who may refuse wearing masks during pandemics, such as the COVID-19 pandemic, because of discomfort resulted by formation of fog on their eyewear, or people who may wear masks improperly (for example by not covering their noses) or those who may create vents in their masks, to prevent formation of fog on their eyewear, will start wearing their masks properly since the device disclosed in this disclosure prevents formation of fog on the eyewear.

DRAWINGS-FIGURES

In the drawings, closely related figures have the same number but different alphabetic suffixes.

FIG. 1A. Illustrates, from the side angle, the disclosed device connected to an eyewear.

FIG. 1B. Illustrates, from the top angle, the disclosed device connected to an eyewear.

FIG. 1C. Illustrates, from the front angle, the disclosed device connected to an eyewear.

Figure 2:
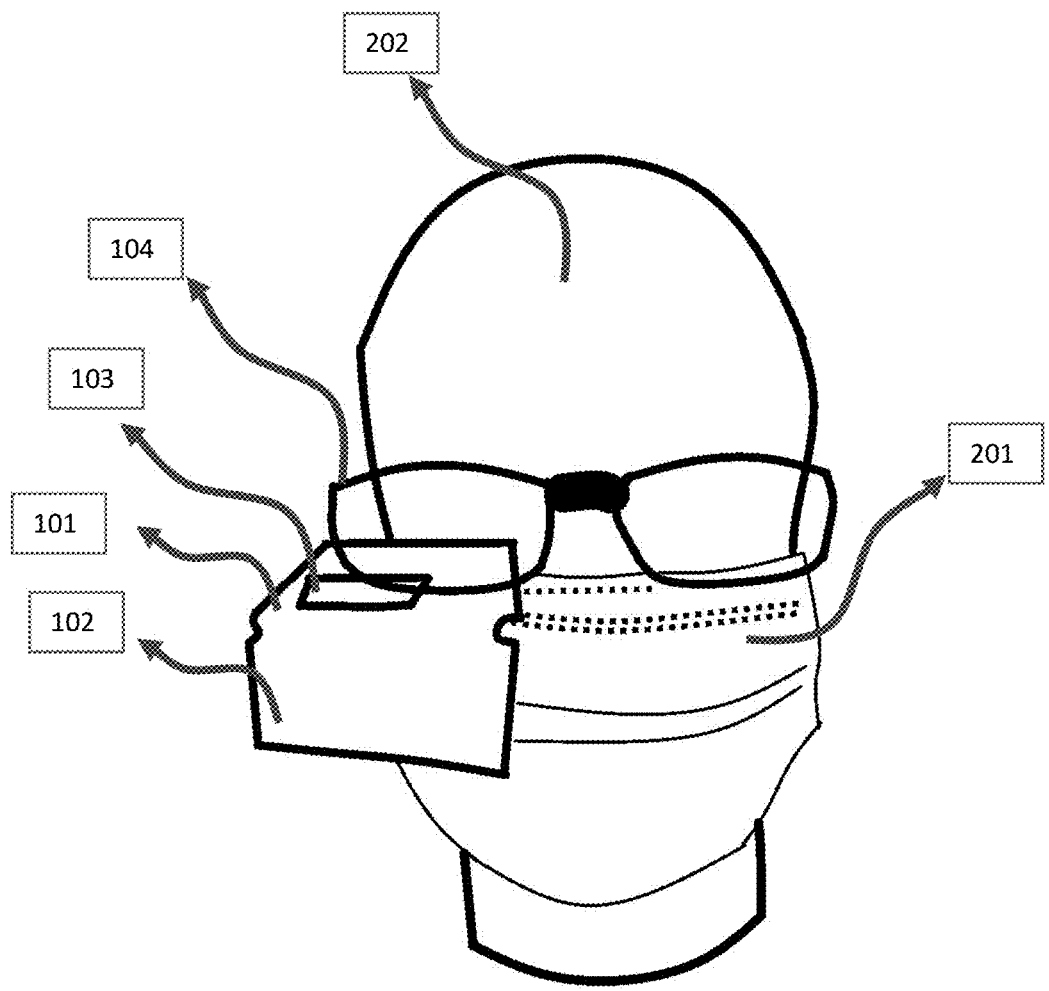
Figure 2:
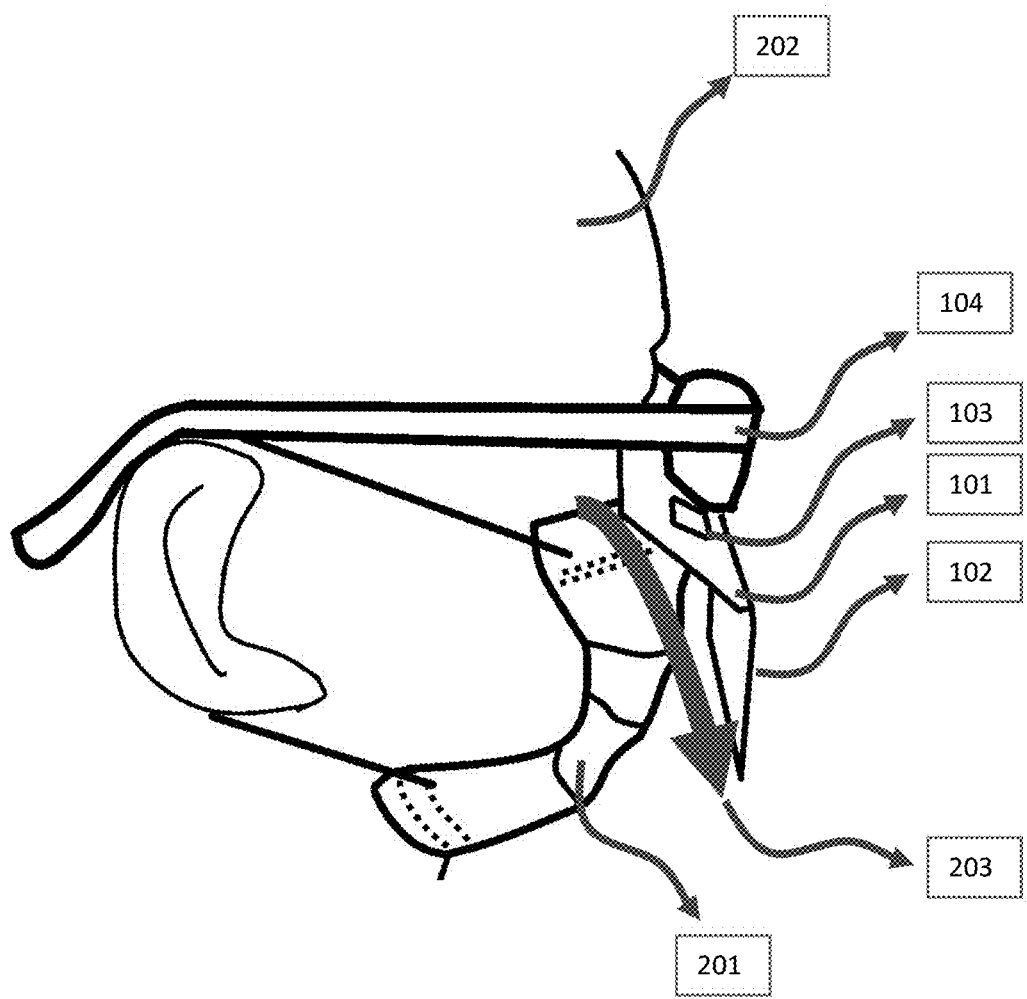

FIG. 2A. Illustrates, from the front angle, the device connected to an eyewear worn by a user wearing a mask.

FIG. 2B. Illustrates, from the side angle, the device connected to an eyewear worn by a user wearing a mask and the direction of the flow of the exhaled air as redirected by the disclosed device.

Figure 3:
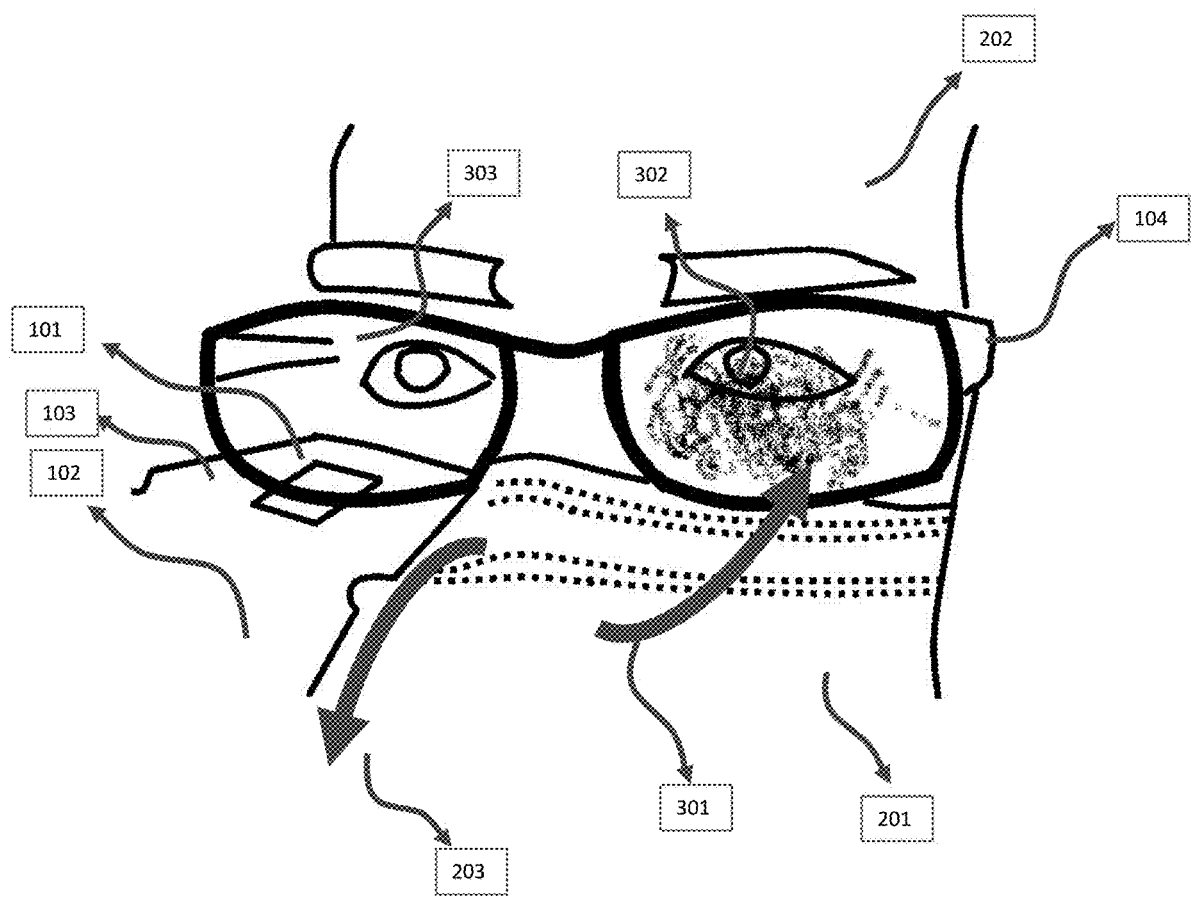

FIG. 3. Illustrates the effectiveness of the disclosed device in a test: the lens of the eyewear that is protected by the device is not fogged whereas the lens that is not protected by the device is fogged as the user exhales.

Figure 4:
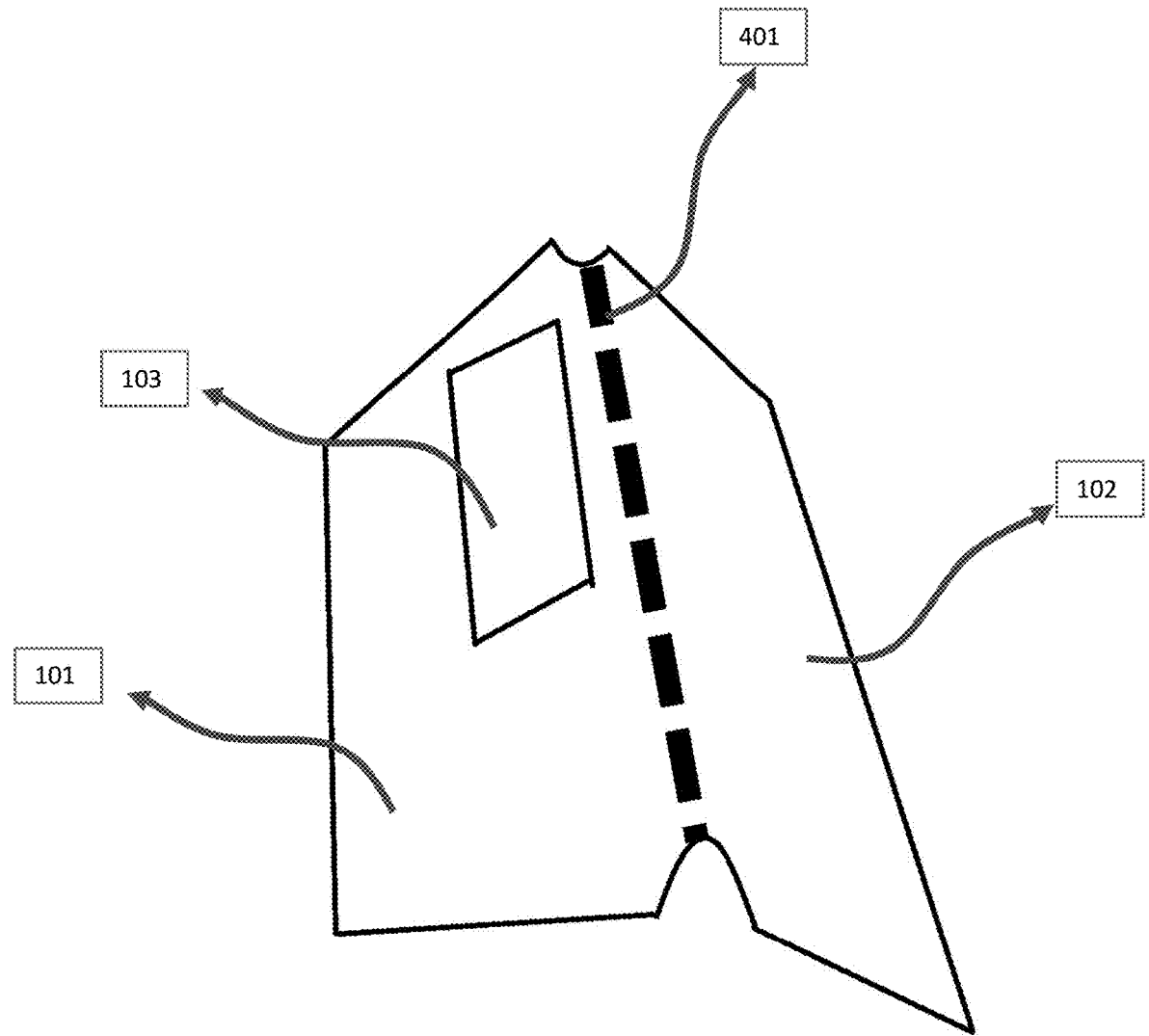

FIG. 4. Illustrates the disclosed device wherein a hinge, 401, is used for connecting 101 and 102 for providing flexibility of adjusting the angle between 101 and 102.

Figure 5:
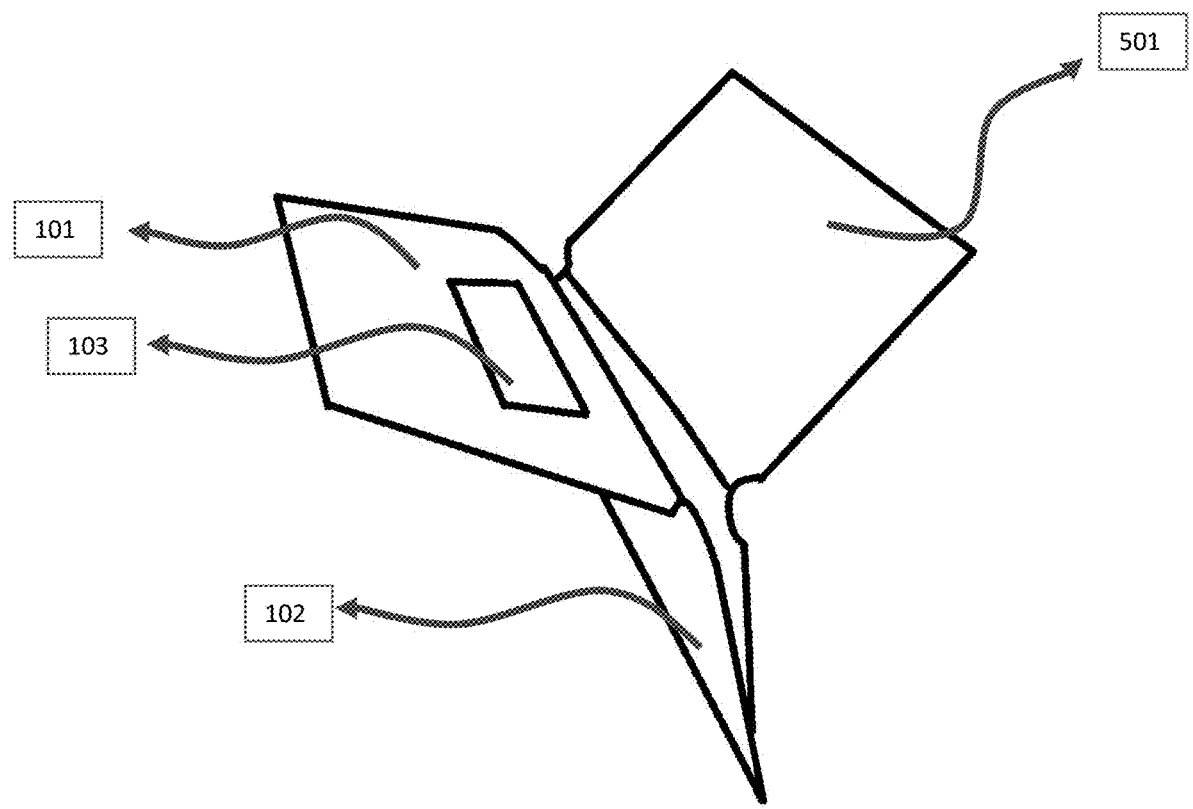
Figure 5:
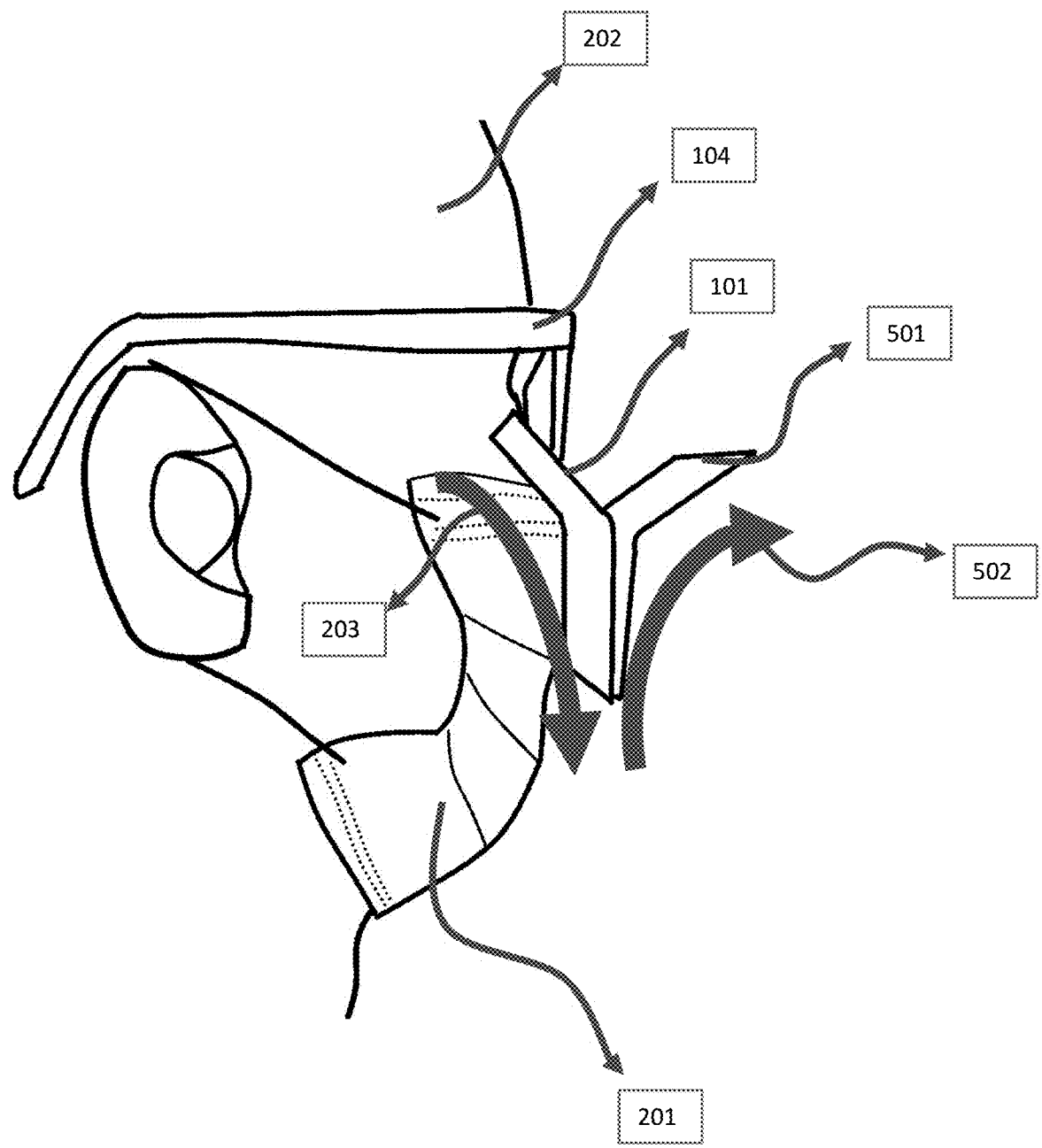

FIG. 5A. Illustrates the disclosed device wherein a third plate, 501, in addition to 101 and 102 is used for extra protection of the outside surface of the lens of the eyewear from the exhaled air.

FIG. 5B. Illustrates the device of FIG. 5A. connected to an eyewear worn by a user wearing a mask and direction of the flow of the exhaled air as redirected by the device.

Figure 6:
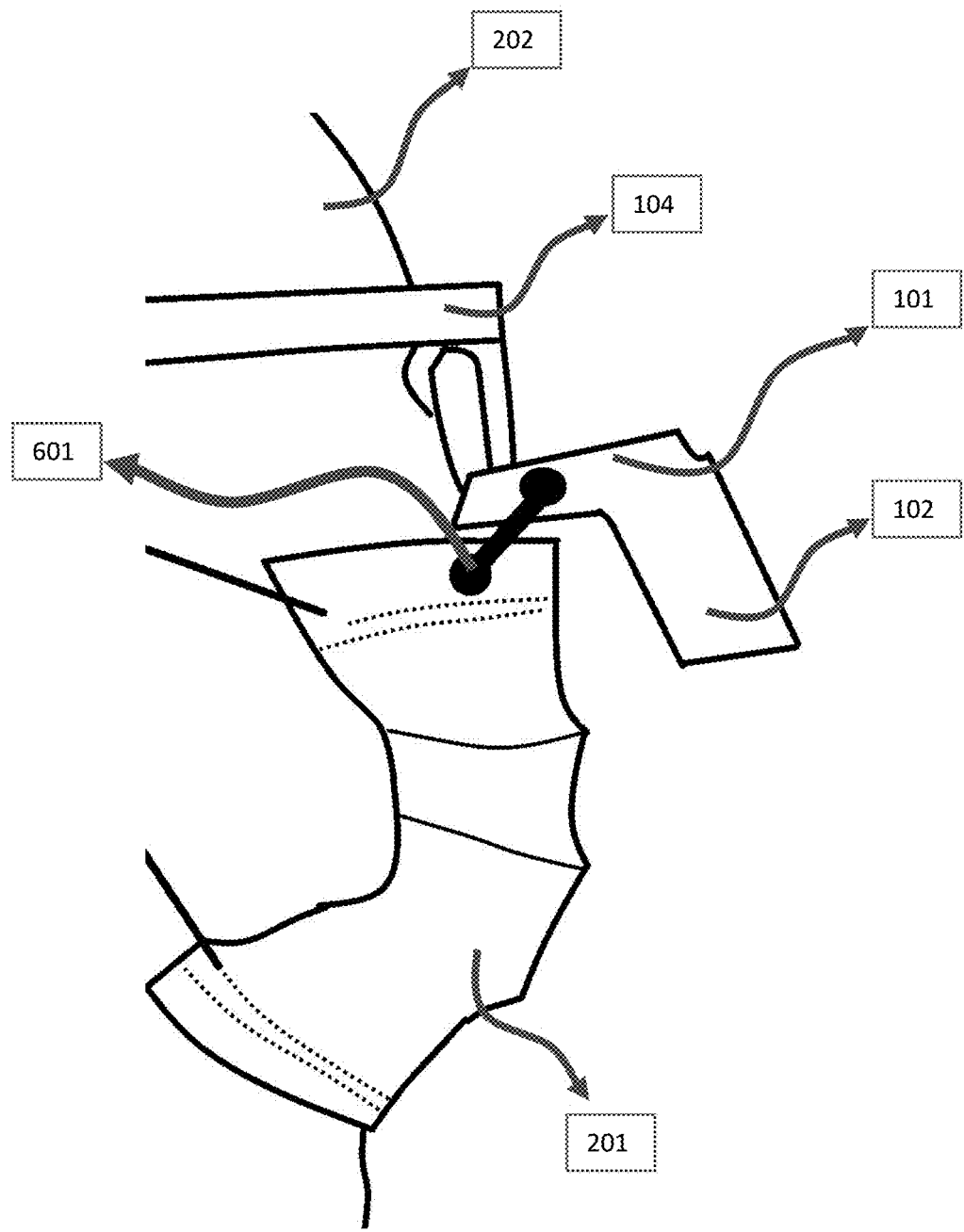
Figure 6:
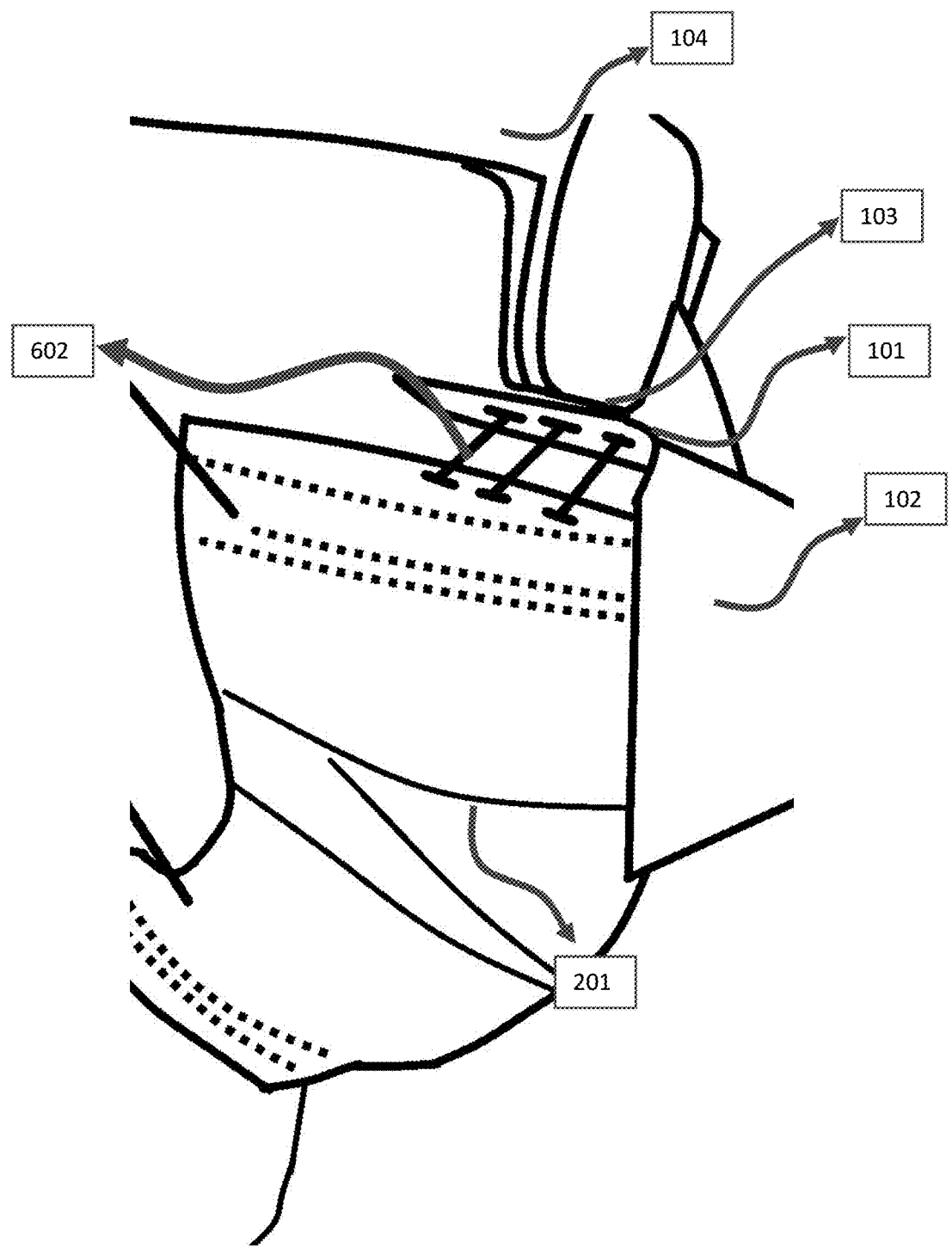
Figure 6:
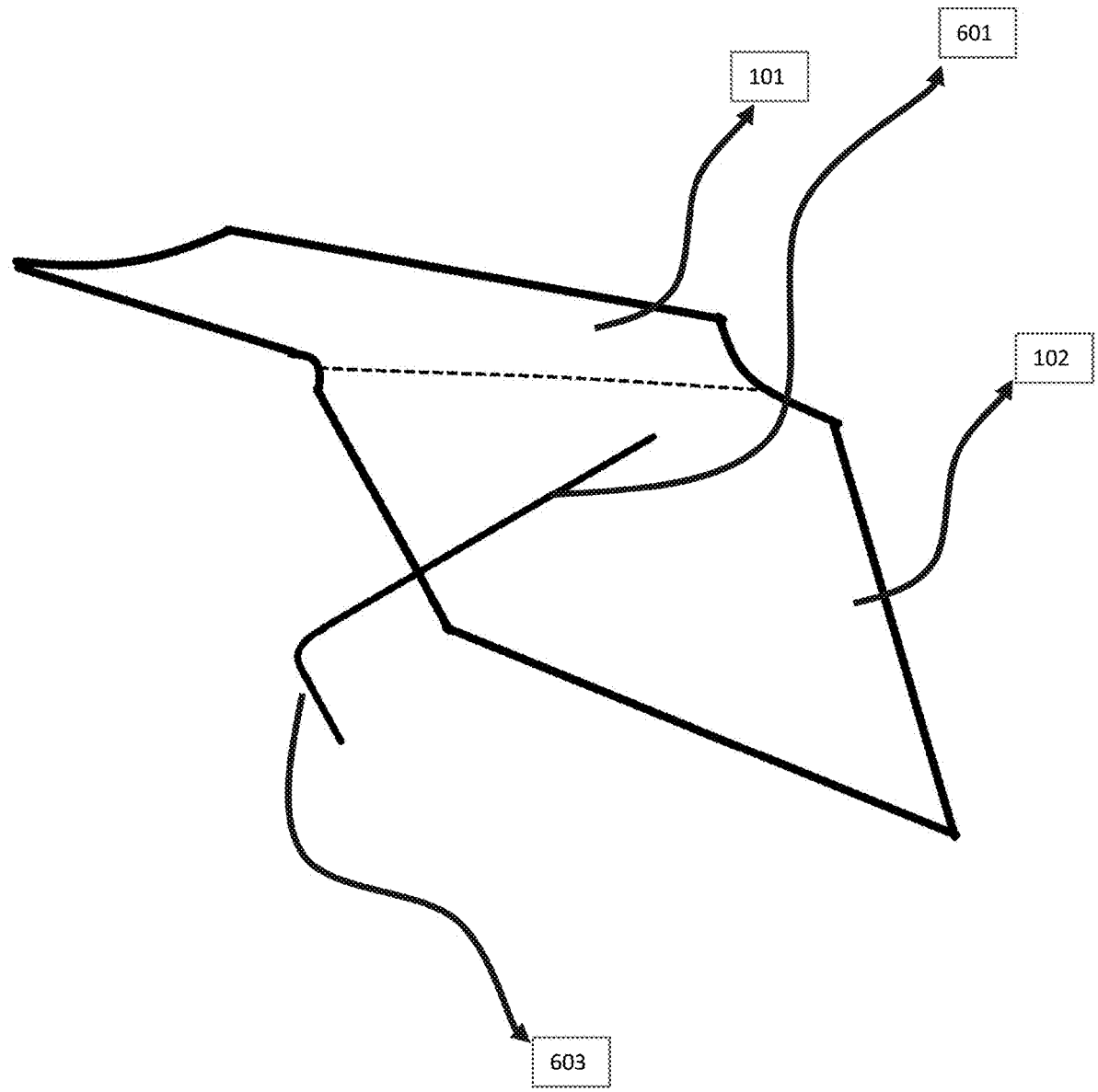

FIG. 6A. Illustrates the device of FIG. 1A. further comprising a holding means, 601, for holding a separation between the upper edge of the mask and 101 for making sure that 101 will be located above the upper edge of the mask so that the leaked exhaled air will face 101 on its way upward and will have a passage under 101 to be redirected farther from entering the space between the face of the user and the inner surface of the lens.

FIG. 6B. Illustrates the device of FIG. 1A. further comprising a "pushing means" (or in another wording "force transferring means"), indicated by 602, for applying direct force on the upper edge of the mask for reducing the amount of opening between the face of the user and the upper edge of the mask.

FIG. 6C. Illustrates an implementation of 601 wherein the end of 601 that faces the mask is bent so that the bent end goes behind the upper edge of the mask and places 601 on the upper edge of the mask.

Figure 7:
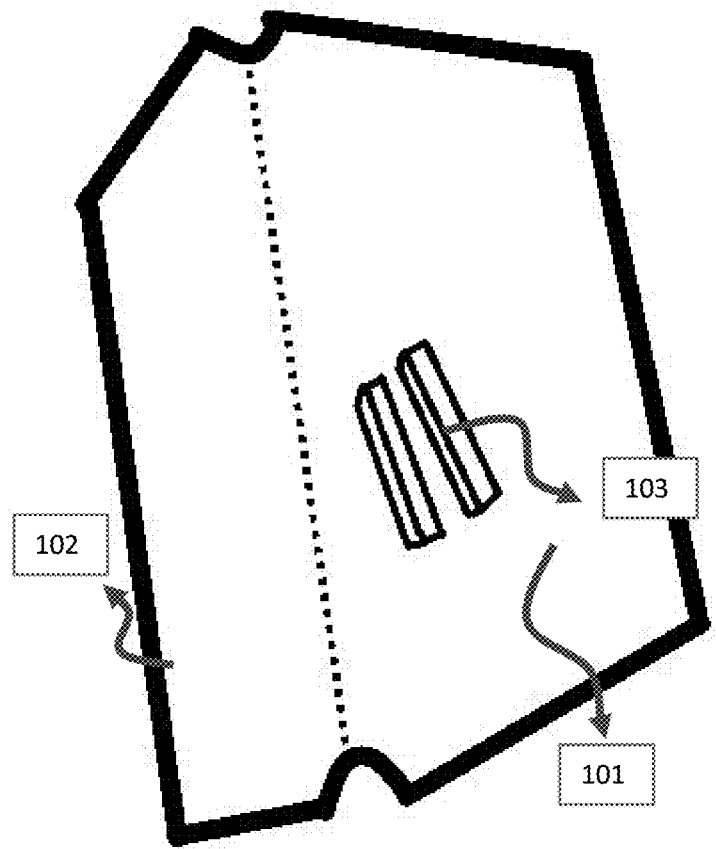

FIG. 7. Illustrates the disclosed device wherein a trench-like clip is used as the connecting means, 103.

FIG. 8A. Illustrates a screenshot captured from the website of the CDC on Sep. 12, 2020 (https://www.cdc.gov/coronavirus/2019-ncov/prevent-getting-sick/cloth-face-cover-guidance.html) regarding the fact that the masks are required to cover the areas of the face that includes the mouth and the nose.

FIG. 8B. Illustrates a screenshot captured from the website of the CDC on Sep. 12, 2020 (https://www.cdc.gov/coronavirus/2019-ncov/prevent-getting-sick/cloth-face-cover-guidance.html) regarding the fact that vents on masks are not recommended.

Figure 9:
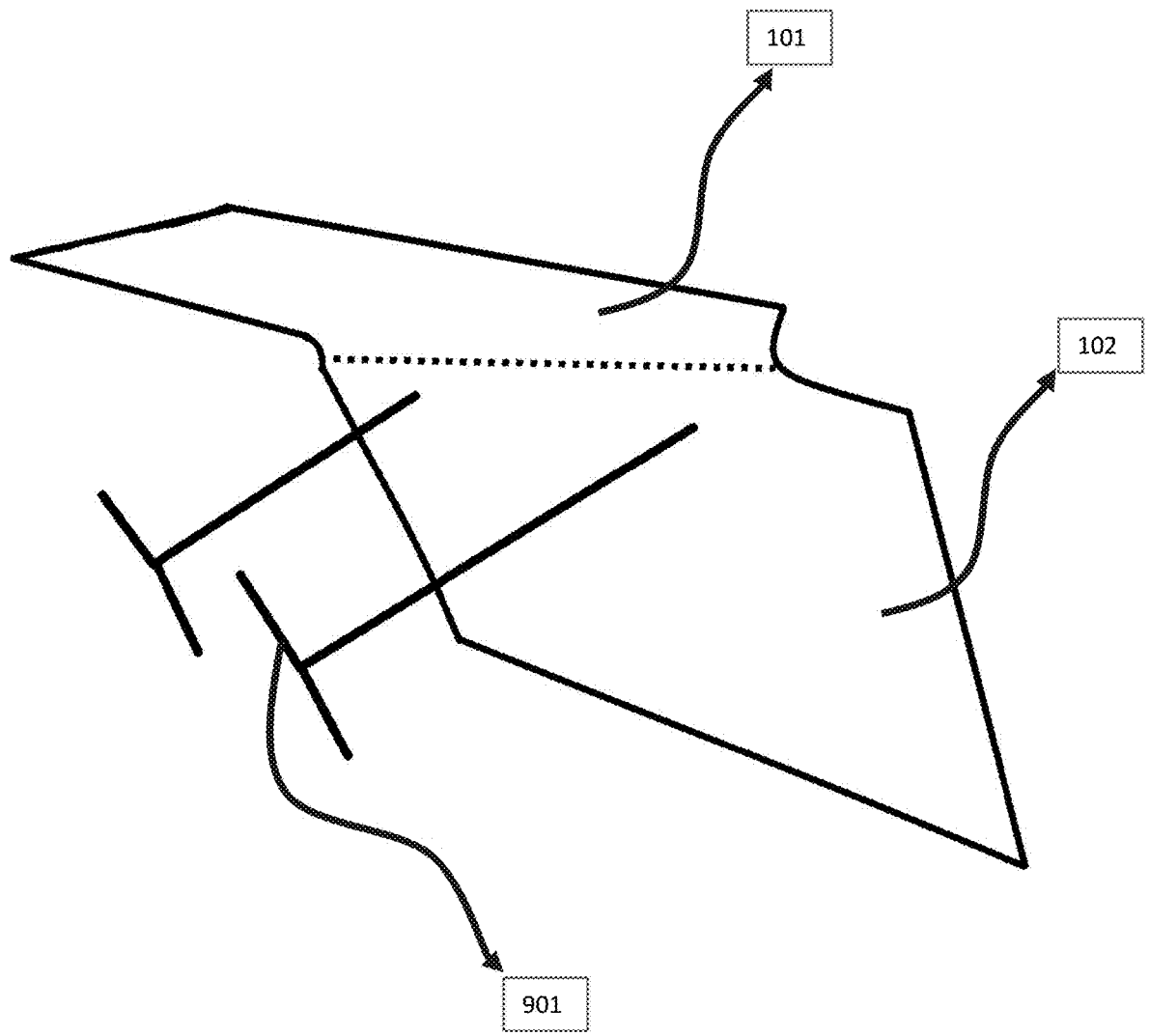
Figure 9:
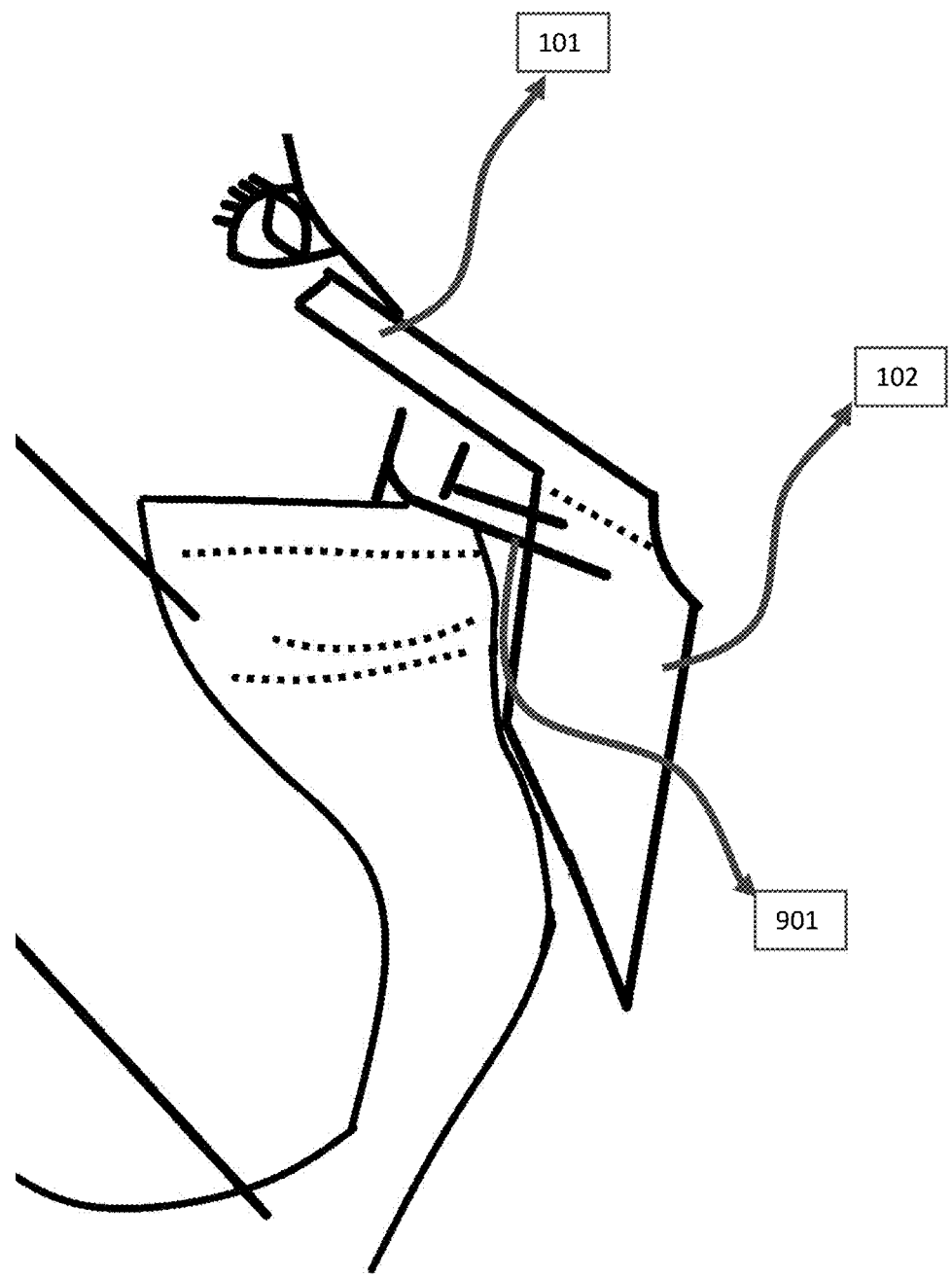
Figure 9:
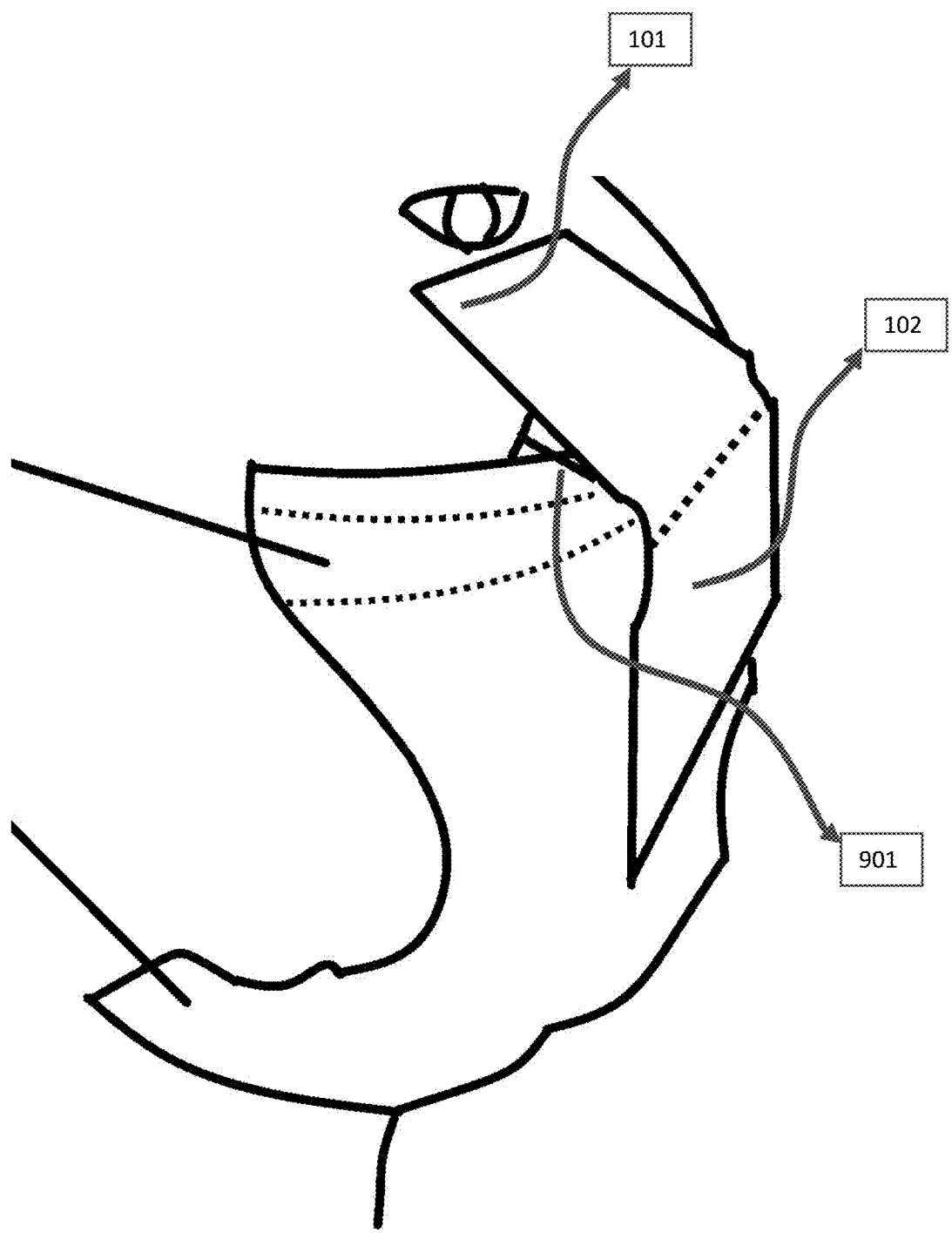
Figure 9:
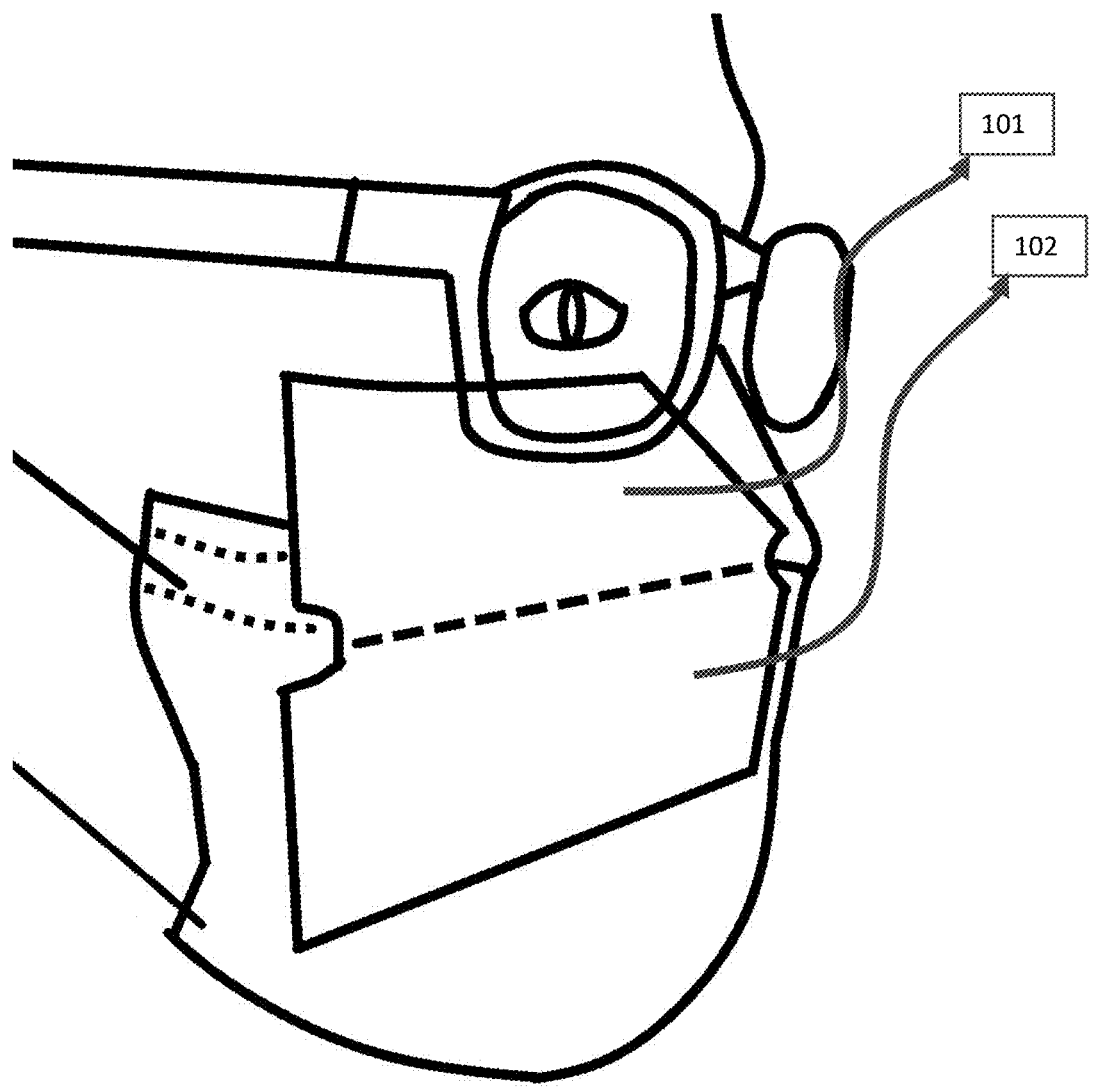

FIG. 9A. Illustrates an embodiment of the disclosed device comprising 101, 102, and a connecting means, 901, for connecting the device to a face covering mask.

FIG. 9B. Illustrates the device of FIG. 9A. connected to a face covering mask, through 901, worn by a user.

FIG. 9C. Illustrates the device of FIG. 9A. connected to a face covering mask, through 901, worn by a user.

FIG. 9D. Illustrates the device of FIG. 9A. connected to a face covering mask, through 901, worn by a user who is wearing an eyewear.

REFERENCE NUMERALS

101 First plate, or an air impervious element
102 Second plate, or an air impervious element
103 Connecting means for connecting the device to an eyewear
104 An eyewear
105 Perpendicular (with respect to the face of the user) direction, z
106 Horizontal direction (with respect to the face of the user), x
107 Angular direction (with respect to the face of the user), θ
108 Vertical (with respect to the face of the user) direction, y
201 A face covering mask
202 A user
203 Direction of the exhaled air that leaks from the top of the mask and is redirected by the disclosed device
301 Direction of the exhaled air that leaks from the top of the mask
302 A lens of the eyewear that is foggy as a result of being exposed to the leaked exhaled air
303 A lens of the eyewear that is not foggy as a result of being protected by the disclosed device
401 A hinge connecting 101 and 102 providing means for adjusting the angle between 101 and 102
501 A third plate, or an air impervious element, for extra protection of the lens of the eyewear from the exhaled air
502 Direction of the exhaled air redirected by 501
601 Holding means for holding a separation between the upper edge of the mask and 101 for providing a passage to the leaked exhaled air (so that the leaked exhaled air will have a passage to be redirected farther away from the space between the face of the user and the lens of the eyewear). 601 may be shorter (in z direction) than 101 to make sure that the leaked exhaled air will certainly face 101 when the leaked exhaled air moves upward.
602 Pushing means (or in another wording "force transferring means") for applying direct force on the upper edge of the mask for reducing the amount of opening between the face of the user and the upper edge of the mask
603 The end of 601 that is bent so that the bent end goes behind the upper edge of the mask and places 601 on top of the upper edge of the mask.

DETAILED DESCRIPTION OF THE INVENTION

FIG. 1A-C illustrate the disclosed device attached to an eyewear. This device is comprised of at least one plate (or in another wording an air impervious element) which is indicated as 101. 101 is an air impervious element having a top surface, a bottom surface, a first end, a second end, and a middle portion between the two ends. 101 extends between the face of the user and the lower edge of the eyewear worn by the user. The side (the first end) of 101 that extends toward the face of the user is located on or above the upper edge of the mask to prevent the leaked (from the top of the mask) exhaled air from penetrating the space between the eye and the inner surface of the lens. The other side (the second end) of 101 extends toward the eyewear. 101 may be tilted to so that the side (the first end) of 101 that extends toward the face of the user can be placed on or above the upper edge of the mask even when the mask is covering areas of the face that are above the lower edge of the eyewear. The side of 101 that extends toward the face of the user (the first end) may or may not touch the skin of the face of the user. The side of 101 that extends toward the face of the user (the first end) may be carved to match the shape of the face of the user. The side of 101 that extends toward the face of the user (the first end) may or may not include pliable materials. The side of 101 that extends toward the face of the user (the first end) may or may not include adhesive materials to be attached to the skin of the face of the user. The disclosed device may be used only for one lens of the eyewear. The disclosed device may be used for both lenses of the eyewear. The disclosed device may be manufactured in two pieces, so that each piece independently be used for each of the two lenses of the eyewear or it may be manufactured in one peace so that said one peace would be used for the entire eyewear (both of the lenses). As the exhaled air leaks from the top of the mask and moves upward, the exhaled air encounters 101 and thereby 101 redirects the leaked exhaled air. 101 does not need to be % 100 air impervious, because the pressure of the leaked exhale air is not very high. Hence, even a filtering material similar to the texture of the mask, facial tissue, or napkin would provide the needed functionality for redirecting the leaked exhaled air. For better redirecting of the exhaled air and making sure that the outside surface of the lens of the eyewear is also not being exposed to the exhaled air, 101 may extend beyond the lower edge of the eyewear in z direction.

Further, for redirecting the exhaled air downward, away from the eyewear, 101 may bend, or curve, downwardly and may form a second plate, or an air impervious element, which is illustrated by 102. In addition to adding an extension to 101 for keeping the leaked exhaled air away from the eyewear, 102 blocks (from moving toward the eyewear) and redirects (farther away from the eyewear) the exhaled air that emerges from the surface of the mask itself.

For adjusting the angel between 101 and 102, a hinge may be placed between 101 and 102. The hinge is illustrated later in FIG. 4 by 401.

103 is a connecting means for attaching the device to an eyewear. 103 may further provide flexibility of adjusting the location of the device on the eyewear with respect to the face of the user by providing movements in horizonal, 106, vertical, 108, perpendicular, 105, and angular, 107, directions. For building the prototype illustrated in FIG. 1A-C, 103 is implemented by using a stripe of double-sided adhesive tape. 103 may also be implemented by devices such as clips, clamps, trench like fasteners, two parallel surfaces, magnets, hook and loop fasteners (by sticking one sheet of the hook and loop fasteners to the lower edge of the eyewear and sticking the other sheet on 101), etc. for connecting the disclosed device to the eyewear. 103 may also be integrated directly into the eyewear during manufacturing the eyewear. In such implementation, the disclosed device shall become an integrated part of the eyewear. High friction and sticky materials such as rubber and silicone may be used for building 103 for providing more friction between 103 and the eyewear. Two parallel plates with sticky inner surfaces, to hold the eyewear between the inner surfaces, may also be used as 103.

101, may be carved to match the shape of the face of the user. The carved edge provides more comfort to the user and also decreases the amount of opening between the face of the user and 101. By lowering the amount of opening between the face of the user and 101, less amount of the leaked exhaled air will escape from being redirected by the disclosed device. As a result, less amount of the leaked exhaled air will move upwardly toward the eyewear, thus less fog will be formed on the eyewear.

Pliable materials may be used for manufacturing 101 and/or 102. Pliable materials may also be added to the edge of 101 that faces the face of the user (the first end) for providing more comfort to the user in case 101 touches the skin of the user. In addition, pliable materials may decrease the amount of opening between the face of the user and the disclosed device, resulting in reducing the leaked exhaled air that escape from facing 101 and moves upwardly toward the eyewear.

Different users may have different sizes of facial features, and different eyewear may have different shapes and sizes. To provide better fitting of the disclosed device on the face of the user and the eyewear a plurality of marks (for example a plurality of dashed lines) may be printed on 101, and 101 may be manufactured by a material easy to be cut by scissors. The marks provide patterns of different shapes and sizes of the face of the human being. By following the marks and cutting 101 the user may obtain ideal shape for 101 that matches the shape of the face of the user.

101 may be manufactured to be expandable (for example, similar to a hand fan) providing 101 with an extendable surface to match the distance between the face of the user and the eyewear. In this way, 101 may also have a closed state (similar to a hand fan) so the user can close it under the eyewear (instead of detaching it from the eyewear) when the device is not being used.

101 may include one or several additional layers, providing 101 with an extendable surface to match the distance between the face of the user and the eyewear. The one or several additional layers may be placed on top of one another and extend (or shrink) 101 in a way that levels of a drawer moves outwardly and inwardly. Springs may also be placed between the layers of 101 so that 101 automatically expands to meet the face of the user.

When the user exhales, the exhaled air leaks from the top of the mask in an upward direction and thus, the lenses of the eyewear of the user become exposed to the leaked exhaled air. As a result, fog is formed on the lenses. Since the top of the mask covers the part of the face of the user that includes organs (such as nose) on the face of human being that are not shaped uniformly (and hence, the face is not flat or is not shaped spherically), there is no way to prevent openings between the skin of the user and the top of the mask (when the mask is solely mounted to the face of the user by straps, or rubber bands that secure the mask to the face by going around the back of the ears or the skull of the user) unless adhesive tapes are used for sealing the top of the mask to the skin of the face of the user, or the sealing force is applied by direct force from the front of the face of the user (as disclosed in an embodiment in the present patent application). Using tapes on the skin is uncomfortable and may be unhealthy for the skin.

According to laws of physics, blocking a moving mass needs a lot more energy than redirecting that moving mass. Accordingly, the main embodiment of the disclosed device in the present patent application does not block the flow of air from the top of the mask. Instead, this device redirects the flow of the leaked exhaled air to a direction farther from the lens of the eyewear.

Unlike the solutions in the prior art, the main embodiment of the device disclosed in this application is a standalone device. No modification to the eyewear is needed (although one embodiment of this invention is integrated in the eyewear during manufacturing the eyewear). No modification to the face covering mask is needed either (although one embodiment of this invention is integrated in the face covering mask during manufacturing the face covering mask). The disclosed device is a standalone device that may be connected to the eyewear. This device may be connected to the mask as well. This device may also be worn, and be fixed on the face of the user, via straps, or rubber bands, the same way a face covering mask is worn. This device can also be integrated into the eyewear and mask during manufacturing the eyewear or the mask.

FIG. 2A-B. illustrates the disclosed device attached to an eyewear worn by a user (indicated by 202) who wears a face covering mask (indicated by 201). 203 in FIG. 2B illustrates the direction of the exhaled air leaked from the top of the mask redirected by the disclosed device. As 203 illustrates, as a result of redirecting the exhaled air, the lenses of the eyewear are not exposed to the exhaled air, thus fog will not be formed on the lenses.

FIG. 3 illustrates the effectiveness of the disclosed device in a test performed by the present inventor. 301 is the direction of the flow of the exhaled air leaked from the top of the mask. 302 is the lens of the eyewear that is exposed to the flow of exhaled air leaked from the top of the mask. The formation of fog is evident on 302. 303 is the lens of the eyewear that is protected by the disclosed device, thus is not exposed to the flow of exhaled air leaked from the top of the mask. It is evident on the photo that fog is not formed on 303.

FIG. 4 illustrates the disclosed device further comprising a hinge between 101 and 102 providing means for adjusting the angle between 101 and 102. Adjusting the angle between 101 and 102 may provide better comfort to the user. In addition, adjusting the angle may provide better accommodation for different sizes of masks since different types of masks have different sizes. For example, N95 masks may extend further from the face of the user compared with surgical masks.

FIG. 5A. illustrates the disclosed device further comprising a third plate, indicated by 501, (in addition to 101 and 102) for extra protection of the outside surface of the lenses of the eyewear from the exhaled air. The exhaled air leaving 102 may be still warmer than the ambient air. Hence, the density of the exhaled air may be lower than the ambient air, thus convection may happen. As a result of convection, the redirected exhaled air will move upward after leaving 102. 501 provides means for redirecting (away from the eyewear) the exhaled air that is moving upward due to convection. FIG. 5B. illustrates the device of FIG. 5A. connected to an eyewear worn by a user wearing a mask. 502 is the direction of the flow of the exhaled air moving up (due to convection) and being redirected by 501.

Referring to FIG. 6A. now, 601 is a "holding means" for holding a separation between the upper edge of the mask and 101 for making sure that 101 will be located above the upper edge of the mask so that the leaked exhaled air will face 101 on its way upward and will have a passage (vertical opening) under 101. If 101 is placed below the upper edge of the mask, the leaked exhaled air will not face the bottom surface of 101 and will go directly in the space between the face (eye) of the user and the lens of the eyewear and causes formation of fog on the inner surface of the lens. 601 may be shorter (in z direction) than 101 to make sure that the leaked exhaled air will certainly face 101. 601 may be implemented by structures such as a plate, a mesh grid, a bar or a set of bars. One side of 601 is attached to 101 or 102, and the other side is connected to the upper edge of the mask through devises such as a clip, adhesive materials, or two parallel plates wherein the upper edge of the mask will be placed between the two parallel plates. As illustrated in FIG. 6C. the end section of 601 may bend or curve downwardly so that the bent or curved part goes behind the upper edge of the mask (between the face of the user and the mask) and connect 601 to the upper edge of the mask. The end of 601 that is bent is indicated by 603 in FIG. 6C.

Referring to FIG. 6B. now, 602 is a "pushing means" (or in another wording "force transferring means") for applying direct force on the upper edge of the mask for reducing the amount of opening between the face of the user and the upper edge of the mask. In an embodiment of this invention, the disclosed device might only be comprised of 602 and 103, wherein 103 attaches 602 to the eyewear (101 and 102 may not be included in the device). As described throughout this disclosure, face of a human being is not totally flat or not totally spherical. The nose is sticking out of the face causing the force being applied from the straps (which secure the mask on the face through being fastened to the back of the head or back of the ears of the user) to become less effective on the parts of the face such as sides of the nose and areas under the eyes. Hence, the direct force applied by 602 leads to better sealing of the openings between the upper edge of the mask and the face of the user thereby resulting in less amount of leaked exhaled air and less amount of fog on the lens of the eyewear. 602 may be implemented by structures such as a plate, a mesh grid, a bar or a set of bars. Springs may be integrated to said bars (and to said plates, mesh grids, etc.) to apply constant force on the upper edge of the mask. Since not all the people need prescription glasses, the eyewear in this embodiment does not need to have any lenses. The functionality of the eyewear is to provide pushing force that is applied directly from the front of the face of the user (unlike the force that is applied to the sides of the mask from the back of ears or back of the skull of the user through straps or rubber bands). In other words, eyewear in this embodiment refers to any means that can be placed in front of the face of the user similar to sunglasses or prescription glasses but does not necessarily need to have lenses. 602 may also be integrated in the eyewear during manufacturing the eyewear.

FIG. 7. Illustrates the disclosed device wherein a trench-like clip is used as the connecting means, 103. This figure is included in this application to illustrate the fact that 103 can be implemented by clips, clamps, trench like fasteners, hook and loop fasteners, two parallel surfaces, etc. for holding the eyewear. Since different users may have different size of facial features, and different eyewear may have different sizes, a plurality of connecting means may be provided on 101. In this way, the user will be able to adjust the amount of 101 that is placed in the area between the eyewear and the face of the user. 103 may further provide adjustments of 101 in x, y, z, and θ directions.

FIG. 8A. a screenshot captured from the website of the CDC on Sep. 12, 2020 (https://www.cdc.gov/coronavirus/2019-ncov/prevent-getting-sick/cloth-face-cover-guidance.html) regarding the fact that the masks are required to cover the areas of the face that includes the mouth and the nose. FIG. 8B illustrates the guidelines published by CDC regarding the fact that vents on masks are not recommended. FIG. 8B is a screenshot captured from the website of CDC on Sep. 12, 2020 (https://www.cdc.gov/coronavirus/2019-ncov/prevent-getting-sick/cloth-face-cover-guidance.html).

FIG. 9A-D illustrate another embodiment, of the disclosed device wherein the disclosed device is secured above the upper edge of the mask by being connected directly to the mask itself. In this embodiment a connecting means, 901, connects the disclosed device to the mask. In this embodiment the connecting means, 901, also facilitates an opening (a separation, or a passage) in between the upper edge of the mask and 101 so that the leaked exhaled air will face 101 on its upward way, and will be redirected by 101 and will be redirected to said passage (separation). As illustrated in FIG. 9B, 101 may extend beyond 901 toward the face of the user to capture and redirect the leaked exhaled air. The side of 101 that is facing the face of the user may touch the face of the user, and may be carved to match the shape of the face of the user, and may further comprised of pliable material to provide comfort to the user and also to seal the space between 101 and face of the user. 101 may be made of pliable material. The side of 101 that is facing the face of the user may touch the face of the user and further include adhesive materials to be sealed to the skin of the user to completely prevent escape of the leaked exhaled air (that has already leaked from the top of the mask) from 101. As illustrated in FIG. 9B-D, the disclosed device in this embodiment is not connected to the eyewear. This embodiment may be integrated to the mask itself during manufacturing the mask. The difference between this embodiment and what is proposed in the prior art is the fact that in the present invention 101 is placed above the upper edge of the mask so that a passage under 101 (between the upper edge of the mask and the bottom surface of 101) is facilitated to provide the leaked exhaled air (leaked from the openings between the upper edge of the mask and the face of the user) to be redirected away from the lens of the eyewear by 101. Whereas, in the prior art (U.S. Pat. No. 3,888,246) the exhaled air that rises from the mask itself (not the leaked exhaled air from the openings between the face of the user and the top edge of the mask) is either blocked or redirected by an air impervious element secured to the upper portion of the mask. In another prior art (U.S. Pat. No. 4,419,993) the mask is made of an upper region and a lower region, the lower region of the filter means being more permeable to air than the upper region of the filter means. But, with a simple experiment comprising taping the upper edge of the mask to the skin of the face of the user (which is a common practice among healthcare workers and is proposed in U.S. Pat. No. 6,354,296 B1), it is observed that almost no fog (or very little amount of fog) is formed on the eyewear which is an indication of the fact that the air leaked from the openings between the skin of the face of the user and the mask is responsible for formation of most of the fog. Hence, the present invention redirects the leaked exhaled air away from the lens of the eyewear for preventing formation of fog on the lens. Further the optional plates indicated by 102 and 501 redirects the exhaled air that rises from the mask farther from the lens as well.

Although the description above contains many specifications, these should not be construed as limiting the scope of the embodiments but as merely providing illustrations of some of several embodiments. Many other ramifications and variations are possible within the teachings of the various embodiments. For example, as a demonstration of the feasibility of the invention, the applications are shown for preventing formation of fog on glasses when wearing face covering medical masks whereas it can also be used for preventing formation of fog on sunglasses when wearing face covering clothes used for protecting the face in cold weather. Thus, the scope of the invention should be determined by the appended claims and their legal equivalents, rather than by the examples given.

The invention claimed is:

1. An apparatus for preventing formation of fog on an eyewear while wearing a face cover, comprising:
    (a) an air impervious planar plate the air impervious planar plate configured to be positioned outside said face cover and on a higher vertical position with respect to said face cover such that said face cover is located under said air impervious planar plate, and said air impervious planar plate having a front surface that is visible in front of a face of a user, a back surface configured to face the face cover such that said back surface and an outside surface of said face cover face each other, a first end that is configured to be positioned closer to the face of the user as compared with a position of a bottom edge of said eyewear, a second end that is an opposite end of said first end and is configured to be positioned farther from the face of the user as compared with a position of said first end, and a middle portion between the first end and the second end such that said middle portion stays in front of and outside said face cover so that an air passage for passing air that exits from the face cover is formed between an outer surface of said face cover and the back surface of said air impervious planar plate;
    (b) at least one connecting means positioned on the front surface of the air impervious planar plate, wherein said at least one connecting means being composed of at least one element for directly attaching the front surface of said air impervious planar plate to the bottom edge of the eyewear such that the front surface of the air impervious planar plate and the at least one connecting means are both perpendicular to lenses of the eyewear; and
    (c) whereby said at least one connecting means secures said air impervious planar plate and said eyewear together such that said second end, which is the end that is configured to be positioned farther from the face of the user, is positioned in a vertical position lower than a vertical position of the bottom edge of said eyewear, and is positioned outside of said face cover, and is configured to extend at least to a position in front of the face of the user equal to the position of the bottom edge of said eyewear in front of the face of the user and said first end is configured to be positioned closer to the face of the user as compared with the position of the lenses of said eyewear, and is positioned outside said face cover and in a higher vertical position than the position of said face cover, such that the back surface of said air impervious planar plate is positioned outside and in front of said face cover such that said air passage is formed between the outer surface of said face cover and the back surface of said air impervious planar plate for guiding the air that exits from the face cover wherein said air moves toward said second end and exits said air passage at said second end, whereby said eyewear which is located on a higher vertical position with respect to said second end, stays away from being exposed to said air and hence stays away from fog.

2. The apparatus of claim 1, wherein said air impervious planar plate is configured to be tilted downwardly with respect to the face of the user so that said first end, which is the end that is configured to be positioned closer to the face of the user, is disposed in a higher vertical position with respect to the bottom edge of said eyewear so that a vertical space is provided wherein an upper edge of said face cover can be pulled up to a higher vertical position than the vertical position of the bottom edge of said eyewear such that said first end is disposed in a higher vertical position with respect to the upper edge of said face cover, as well as the bottom edge of said eyewear, such that said air passage is formed between the outer surface of said face cover and the back surface of said air impervious planar plate such that said air impervious planar plate is positioned outside and in front of said face cover such that the upper edge of said face cover stays under said air impervious planar plate even though said upper edge of the face cover is positioned in a higher vertical position with respect to the bottom edge of the eyewear so that said air passage is formed between said back surface of said air impervious planar plate and the outer surface of said face cover such that exhaled air that freely exits the face cover is configured to be redirected into said air passage and moves inside said air passage away from the upper edge of the face cover and toward a front direction with respect to the face of the user, thereby said exhaled air exits said air passage with a course directed away from the lenses of said eyewear.

3. The apparatus of claim 1, wherein said at least one connecting means is located at said second end wherein said at least one connecting means connects said air impervious planar plate and said eyewear together such that said second end stays under the bottom edge of said eyewear and such that said second end stays outside said face cover.

4. The apparatus of claim 3, wherein said at least one connecting means is integrated permanently to the eyewear such that said eyewear is permanently connected to a top side of said at least one connecting means and such that said air impervious planar plate is permanently connected to a bottom side of said at least one connecting means such that said air impervious planar plate is a permanent part of said eyewear integrated to said eyewear for preventing formation of fog on said eyewear while wearing the face cover.

5. The apparatus of claim 1, wherein said at least one connecting means is located on the middle portion of the front surface of said air impervious planar plate such that the second end of said air impervious planar plate is configured to extend to the front of the face of the user further than a location of the bottom edge of said eyewear.

6. The apparatus of claim 5, wherein said at least one connecting means is integrated permanently to the eyewear during manufacturing of the eyewear such that said eyewear is connected to a top side of said at least one connecting means and such that said air impervious planar plate is connected to a bottom side of said at least one connecting means such that said air impervious planar plate is a permanent part of said eyewear integrated to said eyewear for preventing formation of fog on eyewear while wearing the face cover.

7. The apparatus of claim 5, wherein said air impervious planar plate is configured to extend beyond an outer surface of the lenses of said eyewear in front of the face of the user, in z direction, thereby extending said air passage further than a location of the eyewear in front of the face of the user and thereby redirecting exhaled air in said air passage further away from the outer surface of the lenses of said eyewear thereby preventing exposure of the outer surface of the lenses of said eyewear to the exhaled air thereby preventing the lenses of said eyewear from becoming foggy.

8. The apparatus of claim 1, wherein said air impervious planar plate bends downwardly in front of said face cover and outside said face cover and forms a second air impervious planar plate in front of said face cover and outside said face cover and in a lower vertical position than the position of said eyewear such that said air passage between the back surface of the air impervious planar plate and the outer surface of said face cover is formed such that exhaled air that exits the face cover is redirected to said air passage and downwardly exits said air passage away from the lenses of said eyewear.

9. The apparatus of claim 1, wherein said air impervious planar plate bends downwardly in front of said face cover and outside said face cover and forms a second air impervious planar plate in front of said face cover and outside said face cover and in a lower vertical position than the position of said eyewear for redirecting downwardly exhaled air raised from said face cover away from the lenses of said eyewear.

10. The apparatus of claim 1, wherein said air impervious planar plate curves downwardly in front of said face cover and outside said face cover and in a lower vertical position than the position of said eyewear for redirecting downwardly leaked exhaled air away from the lenses of said eyewear.

11. The apparatus of claim 1, further comprising a holding means positioned between an upper edge of said face cover and said back surface of said air impervious planar plate for maintaining said first end of said air impervious planar plate in a higher vertical position as compared with the position of the upper edge of said face cover thereby maintaining said air passage between the outer surface of said face cover and said back surface of said air impervious planar plate wherein exhaled air moves toward said second end and exits said air passage at said second end away from the lenses of said eyewear.

12. The apparatus of claim 11, wherein said first end is configured to extend toward the face of the user, in a horizontal direction on a z-axis, further than a horizontal location of the upper edge of said face cover on the z-axis such that said back surface stays above the upper edge of said face cover and thereby the exhaled air that leaks from the upper edge of the face cover faces said bottom surface such that the exhaled air is redirected by said back surface into said air passage formed between said back surface of said air impervious planar plate and outer surface of said face cover and such that the exhaled air that exits said air passage at said second end is directed away from the lenses of eyewear.

13. The apparatus of claim 11, wherein said holding means is a bar, or a plurality of bars, having two ends, wherein one end is connected to said air impervious planar plate and an opposite end is connected to the upper edge of said face cover when said apparatus is in use whereby said first end of said air impervious planar plate is maintained in a higher vertical position with respect to said face cover and whereby said air passage is formed between the back surface of said air impervious planar plate and the outer surface of said face cover wherein said exhaled air moves toward said second end and exits said air passage at said second end away from the lenses of said eyewear.

14. The apparatus of claim 1, wherein said at least one connecting means is an adhesive surface located on the front surface of said air impervious planar plate for attaching the bottom edge of said eyewear to said air impervious planar plate such that the bottom edge of said eyewear is adhered to said adhesive surface thereby said apparatus and eyewear are secured to each other.

15. The apparatus of claim 1, wherein said at least one connecting means comprises of two parallel plates that are biased toward each other and are positioned on said front surface of said air impervious planar plate such that the bottom edge of said eyewear is placed between said two parallel plates thereby said air impervious planar plate is secured to said eyewear.

16. The apparatus of claim 15, wherein an inside surface of at least one of said two parallel plates is covered with an adhesive material wherein the bottom edge of said eyewear is disposed between said two parallel plates and wherein the adhesive material adheres to said bottom edge of said eyewear and thereby said air impervious planar plate is secured to said eyewear.

17. The apparatus of claim 1, further comprising a force transferring means having two ends located under said air impervious planar plate wherein one of the two ends of said force transferring means is connected to said air impervious planar plate and an other end is positioned on an upper portion of said face cover, or on an upper edge of said face cover, and outside said face cover, when the apparatus is in use, such that said force transferring means applies force on the upper portion of said face cover, or on the upper edge of said face cover, thereby pushing the upper edge of said face cover on the face of the user for reducing the opening between the upper edge of said face cover and the face of the user thereby reducing an amount of exhaled air that leaks from the upper edge of the face cover.

18. A method for preventing formation of fog on an eyewear while wearing a face cover, comprising:
(a) providing an air impervious planar plate, the air impervious planar plate configured to be positioned outside said face cover and on a higher vertical position with respect to said face cover such that said face cover is located under said air impervious planar plate, said air impervious planar plate having a front surface that is visible in front of the face of a user, a back surface positioned above the face cover and outside said face cover such that the back surface of said air impervious planar plate and the outside surface of said face cover face each other so that an air passage is formed between that the back surface of said air impervious planar plate and the outside surface of said face cover, said air impervious planar plate having a first end that is configured to be positioned closer to the face of the user as compared with a position of a bottom edge of said eyewear, a second end that is an opposite end of said first end and is positioned under the bottom edge of said eyewear, and a middle portion between the first end and the second end such that said middle portion stays above said face cover and outside said face cover so that said air passage is formed wherein exhaled air that exits said face cover is redirected to said air passage and said exhaled air that exits said face cover moves in said air passage such that the exhaled air changes its upward course and exits said air passage at said second end;

(b) providing at least one connecting means positioned on the front surface of the air impervious planar plate, wherein said at least one connecting means being composed of at least one element for directly attaching the front surface of said air impervious planar plate to the bottom edge of said eyewear such that the front surface of the air impervious planar plate and the at least one connecting means are both perpendicular to lenses of the eyewear; and (c) attaching said at least one connecting means to said air impervious planar plate and said eyewear such that said at least one connecting means secure said air impervious planar plate and said eyewear together such that the first end is configured to extend from said eyewear toward the face of the user, outside said face cover and above an upper edge of said face cover so that the back surface of said air impervious planar plate faces exhaled air that leaks from the upper edge of the face cover, thereby the back surface of said air impervious planar plate redirects the leaked exhaled air inside said air passage which is formed between the outside surface of said face cover and the bottom surface of said air impervious planar plate such that the exhaled air changes its course and exits said air passage at said second end thereby said eyewear is not exposed to said exhaled air and thereby formation of fog on the lenses of said eyewear is prevented.

19. An apparatus for preventing formation of fog on an eyewear while wearing a face cover, comprising:

(a) an air impervious planar plate having a front surface, a back surface, a first end, a second end, and a middle portion between two ends;

(b) a holding means located under said air impervious planar plate for providing a hollow space or an air passage between an upper edge of said face cover and under said back surface of said air impervious planar plate wherein exhaled air that leaks from the upper edge of said face cover changes its course and moves toward said second end such that said exhaled air exits said air passage at said second end with a course of direction that takes the exhaled air away from the eyewear (c) at least one connecting means positioned on the front surface of the air impervious planar plate, wherein said at least one connecting means being composed of at least one element for directly attaching the front surface of said air impervious planar plate to the bottom edge of the eyewear such that the front surface of the air impervious planar plate and the at least one connecting means are both perpendicular to lenses of the eyewear; and (d) whereby said at least one connecting means secure said air impervious planar plate and said eyewear together such that the second end is configured to extend from said face cover toward the front of the face of the user, and the holding means assures that the first end is positioned higher than the upper edge of said face cover such that said air passage is formed between said back surface of said air impervious planar plate and an outer surface of said face cover whereby said exhaled air changes its course such that said exhaled air moves inside said air passage toward said second end such that said exhaled air exits said air passage at said second end with a course of direction that takes the exhaled air away from the eyewear so that the lenses of said eyewear are not exposed to said exhaled air and thereby the lenses of said eyewear do not become foggy.

20. The apparatus of claim 19, wherein said air impervious planar plate is configured to extend beyond an outer surface of the lenses of said eyewear in front of the face of the user, in z direction, thereby extending said air passage further than a location of the eyewear in front of the face of the user and thereby redirecting the exhaled air in said air passage further away from the outer surface of the lenses of said eyewear thereby preventing exposure of the outer surface of the lenses of said eyewear to the exhaled air thereby preventing the lenses of said eyewear from becoming foggy.

21. The apparatus of claim 19, wherein said apparatus is integrated in said face cover during manufacturing of said face cover such that said apparatus is a permanent part of said face cover.

22. The apparatus of claim 21, wherein said face cover is a medical mask such that said apparatus is permanently attached to said medical mask.

* * * * *